(12) United States Patent
Morariu et al.

(10) Patent No.: US 7,386,391 B2
(45) Date of Patent: Jun. 10, 2008

(54) DYNAMIC OPTIMIZING TRAFFIC PLANNING METHOD AND SYSTEM

(75) Inventors: Viorel Morariu, Murrysville, PA (US); C. Franklin Boyle, Pittsburgh, PA (US); Uwe Deutermann, Cranberry Township, PA (US); Gregory P. Barry, Munhall, PA (US); Andrey A. Korytko, Pittsburgh, PA (US)

(73) Assignee: Union Switch & Signal, Inc., Pittsburgh, PA (US)

( * ) Notice: Subject to any disclaimer, the term of this patent is extended or adjusted under 35 U.S.C. 154(b) by 549 days.

(21) Appl. No.: 10/538,246

(22) PCT Filed: Dec. 19, 2003

(86) PCT No.: PCT/US03/41207

§ 371 (c)(1),
(2), (4) Date: Jun. 7, 2005

(87) PCT Pub. No.: WO2004/059446

PCT Pub. Date: Jul. 15, 2004

(65) Prior Publication Data

US 2006/0074544 A1    Apr. 6, 2006

Related U.S. Application Data

(60) Provisional application No. 60/435,114, filed on Dec. 20, 2002.

(51) Int. Cl.
*G08G 1/00* (2006.01)

(52) U.S. Cl. ............... 701/117; 701/19; 701/20; 701/200

(58) Field of Classification Search ........ 701/117–119, 701/200, 23, 19–20
See application file for complete search history.

(56) References Cited

U.S. PATENT DOCUMENTS

| 3,706,969 | A | * | 12/1972 | Paredes | ............... 340/989 |
| 4,041,283 | A | | 8/1977 | Mosier | |
| 4,122,523 | A | | 10/1978 | Morse et al. | |
| 4,361,202 | A | * | 11/1982 | Minovitch | ............. 180/168 |
| 4,883,245 | A | | 11/1989 | Erickson, Jr. | |
| 5,177,684 | A | | 1/1993 | Harker et al. | |

(Continued)

FOREIGN PATENT DOCUMENTS

WO    WO 01/50666 A2    7/2001

*Primary Examiner*—Yonel Beaulieu
(74) *Attorney, Agent, or Firm*—Kirk D. Houser; Eckert Seamans Cherin & Mellott, LLC

(57) ABSTRACT

A method generates optimized traffic movement plans. A plan monitor determines a first planning boundary for traffic based upon traffic conditions of a region. A plan generator employs the first planning boundary and repetitively generates first traffic movement plans for the traffic. The plan generator selects one of the first traffic movement plans as a first optimized traffic movement plan, and outputs the same for controlling traffic movement. The plan monitor determines current traffic conditions of the region for a planning window, and updates the first planning boundary to provide a second planning boundary for the traffic based upon the current traffic conditions. The plan generator employs the second planning boundary and repetitively generates second traffic movement plans for the traffic, selects one of the first and second traffic movement plans as a second optimized traffic movement plan, and outputs the same for controlling traffic movement.

94 Claims, 9 Drawing Sheets

U.S. PATENT DOCUMENTS

| | | |
|---|---|---|
| 5,257,194 A | 10/1993 | Sakita |
| 5,374,932 A | 12/1994 | Wyschogrod et al. |
| 5,519,618 A | 5/1996 | Kastner et al. |
| 5,559,707 A | 9/1996 | DeLorme et al. |
| 5,574,648 A * | 11/1996 | Pilley .................. 701/120 |
| 5,623,413 A | 4/1997 | Matheson et al. |
| 5,794,172 A | 8/1998 | Matheson et al. |
| 5,802,492 A | 9/1998 | DeLorme et al. |
| 5,828,979 A | 10/1998 | Polivka et al. |
| 6,135,396 A | 10/2000 | Whitfield et al. |
| 6,141,607 A | 10/2000 | Hergert-Mückusch et al. |
| 6,154,735 A | 11/2000 | Crone |
| 6,218,961 B1 | 4/2001 | Gross et al. |
| 6,304,801 B1 | 10/2001 | Doner |
| 6,321,158 B1 | 11/2001 | DeLorme et al. |
| 6,331,068 B1 | 12/2001 | Chase |
| 6,356,838 B1 | 3/2002 | Paul |
| 6,459,964 B1 | 10/2002 | Vu et al. |
| 6,546,371 B1 | 4/2003 | Doner |
| 6,587,738 B1 | 7/2003 | Belcea |
| 2004/0010432 A1 | 1/2004 | Matheson et al. |

\* cited by examiner

DYNAMIC OPTIMIZING TRAFFIC PLANNING METHOD AND SYSTEM

CROSS-REFERENCE TO RELATED APPLICATION

This application claims the benefit commonly assigned U.S. Provisional Patent Application Ser. No. 60/435,114, filed Dec. 20, 2002, entitled "Dynamic Optimizing Traffic Planner Method and System".

BACKGROUND OF THE INVENTION

1. Field of the Invention

This invention relates generally to a method for traffic planning and, more particularly, to a method for generating and dynamically modifying optimized traffic movement plans. The invention also relates to a dynamic optimizing traffic planning system, such as a railroad or commuter rail dynamic optimizing traffic planning system.

2. Background Information

A transportation infrastructure consists of a plurality of physical pathways (e.g., without limitation, roads; rails; canals) for vehicles (e.g., without limitation, trucks; trains; ships or boats) within a particular geographic region. Traffic planning is the process of determining, for a particular transportation infrastructure and over a finite period of time, a plurality of routes that a corresponding plurality of vehicles are to follow (i.e., one route per vehicle), and where those vehicles are planned to be located along their respective routes at specific times. Together, the plural routes constitute a movement plan.

Although traffic planning has traditionally been carried out by humans, the traffic planning process can also be performed by automated traffic planners, or simply traffic planners, that generate movement plans given transportation infrastructure data, data about the individual vehicles to be planned, vehicle schedules, physical and operational constraints, and other data pertinent to the movement of traffic. In the case of train traffic, for example, such traffic planners employ rail infrastructure data (e.g., tracks; signals; switches), data about the individual trains to be planned, train schedules, physical and operational constraints, and other data pertinent to the movement of trains.

In order to execute movement plans generated by a traffic planner, those movement plans are converted into control commands, which are employed to control the states of field devices, which determine how the vehicles are allowed to move. In the case of trains, the control commands change the aspects of signal lights, which indicate how trains should move forward (e.g., continue at speed; reduce speed; stop), and the positions of switches (i.e., normal or reverse), which determine the specific tracks the trains will run on. In dark (unsignaled) territory, forward movement of trains is specified in terms of mileposts (i.e., a train is given the authority to move from its current location to a particular milepost along its planned route), landmarks or geographic locations. Sending the control commands to the field is done by an automated traffic control system, or simply control system, to which the traffic planner is interfaced. Control systems are employed by railroads to control the movements of trains on their individual properties or track infrastructures. Variously known as Computer-Aided Dispatching (CAD) systems, Operations Control Systems (OCS), Network Management Centers (NMC) and Central Traffic Control (CTC) systems, such systems automate the process of controlling the movements of trains traveling across a track infrastructure, whether it involves traditional fixed block control or moving block control assisted by a positive train control system. In dark territory, controlling the movements of trains is effected through voice communication between a human operator monitoring the control system and the locomotive engineer. Control systems act as an interface between the traffic planner and equipment in the field that receives and carries out the control commands. The interface between the control system and the field devices can either be through control lines that communicate with electronic controllers at the wayside that in turn connect directly to the field devices, or, in dark territory, through voice communication with a human, who manually performs the state-changing actions (e.g., usually switch throws).

A traffic planner both sends and receives information to and from the control system. The traffic planner sends control commands and receives information about the actual states of signals and switches, speed limit changes and train positions in the form of messages that the traffic planner is able to read. A movement plan is translated into a plurality of route clears, switch position changes and other control commands, which are sent to the control system for execution. The control system, in turn, sends those commands to the field in field-device-readable formats. The traffic planner sends control commands to the control system in a timely manner, in order that they coincide with actual changes as they are predicted to occur in the field. That is, in order to control the movements of trains in real time, the commands have to be sent to the field in such a way that they conform to the current positions of the trains. For example, signals should be cleared (i.e., turned green) ahead of a train in such a way that it is able to maintain its speed, but not so far ahead that they interfere with the planned movement of another train moving in the opposite direction, which was to traverse the same track before the train for which the signals were cleared.

Some traffic planners employ the information received from the control system (i.e., field updates) to modify the currently executing movement plan, in order to account for changes in the field that occurred since the time the currently executing movement plan was generated, which changes were not expected to occur. That is, the primary reason, though not the only reason, to modify the currently executing movement plan is if changes are happening in the field that are not in the plan. The planned state of the field needs to conform as closely as possible to the actual state of the field, in order that whatever the plan says should be done can be carried out (i.e., the configuration of trains enables the control commands to work as expected). If the trains and devices in the field act according to their planned or expected behaviors as set forth in or otherwise implied by the currently executing movement plan, then no field updates will have to be incorporated.

Human operators employ control systems to monitor the movements of trains using computer interfaces, which schematically display such movements in near-real time. Two types of such interfaces are common. The first interface is a track diagram, which displays tracks in a not-to-scale, non-geographical manner, in order to indicate the locations of trains on the tracks, their authorities to move (lined routes), track switches and their positions, signal lamps and their colors, as well as other miscellaneous devices, such as hot box detectors for detecting hot wheel bearings, and landmarks, such as bridges. The key feature of track diagrams is the display of what is happening in the field in near-real time. Track diagrams indicate the current locations of trains and where they have been given the authority to move.

The second interface, as employed by human operators to monitor the operations of a railroad, is a "string-line," which is a time-distance graph of where the trains are planned to be and when. Typically, the vertical axis of this graph shows locations (usually indicated by station names) and the horizontal axis shows time. The movements of trains are displayed as diagonal lines that are slanted downward or upward depending on the direction of movement. Thus, string-lines for two trains moving in opposite directions over the same rail line during the same time period would form an X-like structure. Although time-distance graphs are generally not drawn to scale, the slopes of the string-lines roughly indicate the speeds of the respective trains. For instance, during the time a train is stopped, its string-line would be horizontal. The faster a train moves, the greater the absolute value of the slope of its string-line. The key feature of string-line graphs is that they depict how trains are planned to move in the future. A train operator is able to see where two trains are planned to meet or when a train is planned to arrive at a particular location.

Traffic planning can be classified as being non-optimizing or optimizing. Non-optimizing traffic planning involves the determination of routes irrespective of performance criteria (e.g., on-time arrival at destinations; relatively higher average speeds).

Several railroads are known to employ a non-optimizing traffic planner, which does not have the capacity to optimize the movements of trains across a rail network. It is constrained to work according to a fixed set of rules. Specifically, it plans trains according to a fixed set of train priorities, in order that movement of a highest priority train is planned first, movement of a next highest priority train is planned second, and so forth down to the lowest priority train. Whenever there is a conflict (e.g., two trains attempting to use the same piece of track at the same time), the non-optimizing traffic planner resolves the conflict in accordance with the priorities of the corresponding trains (i.e., the highest priority train moves across the track first). An example of such a non-optimizing traffic planner is the AutoRouter (or ART) marketed by Union Switch & Signal, Inc. of Pittsburgh, Pa.

In contrast, optimizing traffic planning employs optimization objectives to guide the planning process, in order that the resulting movement plan best satisfies one or more performance criteria. Optimizing traffic planning is of interest to freight railroads because the demand for service (e.g., hauling goods) is increasing and is predicted to continue in this manner for the foreseeable future. Since it is relatively very expensive to lay new rail, which is one way to increase service capabilities, the railroads are looking for ways to utilize more of the capacity of their existing rail infrastructure. Traffic planning that optimizes the movements of trains is able to increase the density of traffic, thereby utilizing more existing rail infrastructure capacity, while also maintaining a high level of on-time performance, which is very important to customers of the railroads.

Traffic planning, whether optimizing or non-optimizing, can also be partitioned into static and dynamic planning. Static planning is the process of generating an initial movement plan from rail infrastructure data, data about the individual trains to be planned, train schedules, physical and operational constraints, and other data pertinent to the movement of trains. The initial movement plan specifies the movements of all of the trains that will be running within a particular geographic region over a finite period of time. Once generated, the initial movement plan can be executed, as discussed above. Static planning implies that no modifications to the initial plan are ever made.

Dynamic planning consists of replacing the currently executing movement plan with a new movement plan as a result of changes that occurred in the field, which were unexpected and, therefore, not accounted for by the currently executing movement plan. That is, events did not take place in the field as planned (e.g., trains may have moved more slowly than planned; a speed limit may have been imposed on a particular segment of track; a device failure may have occurred). Only when the field is changing according to plan (or very close to plan) is dynamic planning not required. Since there are always changes occurring in the field that were not expected or planned for, traffic planning on the railroads, if it is to be effective, must be dynamic.

Known dynamic planning can be classified into two distinct types depending on the way in which the new movement plan is generated. The first type consists of generating a completely new plan, independently of the currently executing plan, and then replacing the currently executing plan with the new plan. No modifications are made to the currently executing plan in order to produce the new plan. Neither is any data from the currently executing movement plan used in the generation of the new movement plan.

The second type of dynamic planning involves modifications to the currently executing movement plan. The modifications are highly localized changes, such as moving a single meet point (i.e., the point where one train must wait for another to pass) or adjusting individual train speeds in order that an already planned meet point is preserved. These modifications typically affect only one or two trains and one or two infrastructure locations, leaving the rest of the movement plan unchanged.

In the case of optimizing traffic planning, the first type of dynamic planning produces a new, optimized movement plan independently of the currently executing plan. This dynamic planning method can be costly from the standpoint of time, since generating an initial plan can take considerably more time than modifying the currently executing plan, depending on the optimization methods employed.

The second type of dynamic planning employs local optimization, which may adversely affect the globally optimized movement plan; that is, the degree of optimization of the overall plan as measured against the objectives is likely to be less. In most cases, local optimization does not improve the overall global optimization of a plan.

U.S. Pat. Nos. 5,794,172 and 6,154,735 disclose various optimization methods for generating movement plans for a plurality of trains. The methods claimed in U.S. Pat. No. 5,794,172 are simulated annealing for coarse-grained optimization (to generate a higher-level schedule for train movement) and branch and bound for more fine-grained optimization (to generate a more detailed movement plan from the schedule). U.S. Pat. No. 6,154,735 claims methods of constraint propagation and focused simulated annealing for generating optimized movement plans. U.S. Pat. No. 5,794,172 also claims a system for which adjustments are made to trains not adhering to the predetermined movement plan (the currently executing plan). Such adjustments are then communicated to those trains. The same patent also claims a system for which the resolution of conflicts (two trains attempting to access the same track at the same time), when they occur, is by means of branch and bound techniques. A system incorporating adjustments to individual trains or the resolution of specific conflicts would be an implementation of the second type of dynamic planning.

U.S. Pat. No. 5,623,413 claims branch and bound and procedure-based inference methods for generating optimized train movement plans, and methods for re-scheduling by rule relaxation or by constraint relaxation, which involve rule-based inference and constraint-based inference, respectively. A system implementing these re-scheduling methods would be considered an example of the second type of dynamic planning.

U.S. Pat. No. 5,177,684 discloses an optimizing train movement planner that generates movement plans from predetermined train schedules (i.e., scheduled departure and arrival times of trains are fixed). A depth-first search algorithm bounded by delay costs (costs incurred by delaying one vehicle so that another can pass) adjusts train meet points that are infeasible (i.e. meet points that occur on a single track) to locations where those meets can take place. This train movement plan optimization method determines whether proposed schedules may be met by the trains without the addition of any substantial costs due to delays of the trains at the proposed meet points.

U.S. Pat. Nos. 6,304,801 and 6,546,371 disclose a gradient search method for optimizing the movements of trains over a rail corridor in particular. The gradient search method is guided by a cost function that enables an optimum schedule to be determined for departing trains by moving each meet point to a siding and evaluating the cost incurred in doing so. Individual train schedules can also be adjusted by changing train speeds and/or train departure times (i.e., the times at which trains enter the corridor).

U.S. Pat. No. 6,459,964 claims a system for coarse-grain scheduling of trains and a method for fine-grain movement plan generation. U.S. Pat. No. 6,459,964 also claims a movement plan repair method that is an example of the second type of dynamic planning described above. The system monitors the progress of trains against the fine-grain movement plan, identifying conflicts between trains in the use of track. It then determines available meet point options for resolving overlapping track usage by trains and selects the one with the least impact on the overall movement plan (local optimization). There is no consideration of any conflicts that may result from the implementation of the selected option. This repairs problems when they arise, independent of the effects those repairs (i.e., new meet points) might have on causing train conflicts further out in time.

There is room for improvement in methods for traffic planning and in traffic planning systems.

SUMMARY OF THE INVENTION

These needs and others are met by the present invention, which dynamically optimizes the movements, for example, of trains across a railroad network in a dynamically changing environment. For example, computer software generates a plurality of train movement plans, modifies those plans to account for unexpected changes to expected railroad train operations, and selects an optimized train movement plan. This software-based method and system thus re-plans the movements of trains in a dynamic environment, such as a dynamically changing railroad network.

A third type of dynamic planning is disclosed, which, like the second type of dynamic planning, involves modifications to the currently executing plan, but which differs from the second type in that each change is allowed to affect the rest of the movement plan. That is, the rest of the movement plan is adjusted to accommodate each change.

In the case of optimizing traffic planning, the third type of dynamic planning incorporates the changes made to the currently executing movement plan by globally optimizing the currently executing movement plan with those changes included. This also differs from the first type of dynamic planning in that plan data from the currently executing movement plan is used in the generation of the new movement plan.

As one aspect of the invention, a method of generating optimized traffic movement plans for a region having a plurality of traffic and a plurality of traffic conditions comprises: determining a first planning boundary for the traffic based upon the traffic conditions of the region; employing the first planning boundary and repetitively generating a first plurality of traffic movement plans for the traffic of the region; selecting one of the first plurality of traffic movement plans as a first optimized traffic movement plan for execution; outputting the first optimized traffic movement plan for controlling traffic movement in the region; determining current traffic conditions of the region; updating the first planning boundary to provide a second planning boundary for the traffic based upon the current traffic conditions; employing the second planning boundary and repetitively generating a second plurality of traffic movement plans for the traffic of the region; selecting one of the first and second plurality of traffic movement plans as a second optimized traffic movement plan for execution; and outputting the second optimized traffic movement plan for controlling traffic movement in the region.

The method may employ a first plurality of traffic conditions for the first optimized traffic movement plan, and may compare the current traffic conditions against the first plurality of traffic conditions for the first optimized traffic movement plan, and responsively plan with the second planning boundary based substantially upon the first plurality of traffic movement plans to repetitively generate the second plurality of traffic movement plans for the traffic of the region.

The method may employ a first plurality of traffic conditions for the first optimized traffic movement plan, and may compare the current traffic conditions against the first plurality of traffic conditions for the first optimized traffic movement plan, and responsively re-plan with the second planning boundary to repetitively generate as the second plurality of traffic movement plans for the traffic of the region: (a) a third plurality of traffic movement plans based substantially upon some of the first plurality traffic movement plans for the traffic of the region, and (b) a fourth plurality of traffic movement plans independent of the first plurality traffic movement plans for the traffic of the region.

As another aspect of the invention, a dynamic optimizing traffic planning apparatus for a region having a plurality of traffic and a plurality of traffic conditions of the traffic comprises: means for inputting information representing the traffic conditions; and means for executing a plurality of routines, the routines comprising: a plan monitor determining a first planning boundary for the traffic based upon the traffic conditions of the region, determining current traffic conditions of the region, and updating the first planning boundary to provide a second planning boundary for the traffic based upon the current traffic conditions, a plan generator successively employing the first planning boundary and the second planning boundary and repetitively generating a first plurality of traffic movement plans and a second plurality of traffic movement plans, respectively, for the traffic of the region, selecting one of the first plurality of traffic movement plans as a first optimized traffic movement plan for execution, selecting one of the first and second plurality of traffic movement plans as a second optimized traffic movement plan for execution; and successively outputting the first and second optimized traffic movement plans, and a plan executive successively converting the first and the second optimized traffic movement plans into a plurality of commands for controlling traffic movement in the region.

As another aspect of the invention, a traffic management system for a region having a plurality of traffic and a plurality of traffic conditions of the traffic comprises: means for inputting information representing the traffic conditions; means for executing a plurality of routines, the routines comprising: a plan monitor determining a first planning boundary for the traffic based upon the traffic conditions of the region, determining current traffic conditions of the region, and updating the first planning boundary to provide a second planning boundary for the traffic based upon the current traffic conditions, a plan generator successively employing the first planning boundary and the second planning boundary and repetitively generating a first plurality of traffic movement plans and a second plurality of traffic movement plans, respectively, for the traffic of the region, selecting one of the first plurality of traffic movement plans as a first optimized traffic movement plan for execution, selecting one of the first and second plurality of traffic movement plans as a second optimized traffic movement plan for execution; and successively outputting the first and second optimized traffic movement plans, and a plan executive successively converting the first and the second optimized traffic movement plans into a plurality of commands for controlling traffic movement in the region; and means for executing the commands to control traffic movement in the region.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention will be disclosed in connection with a method and software system generating optimized movement plans for trains across a regional railroad network, although the invention is applicable to a wide range of traffic applications (e.g., without limitation, railroad; commuter rail; canals).

Figure 1:
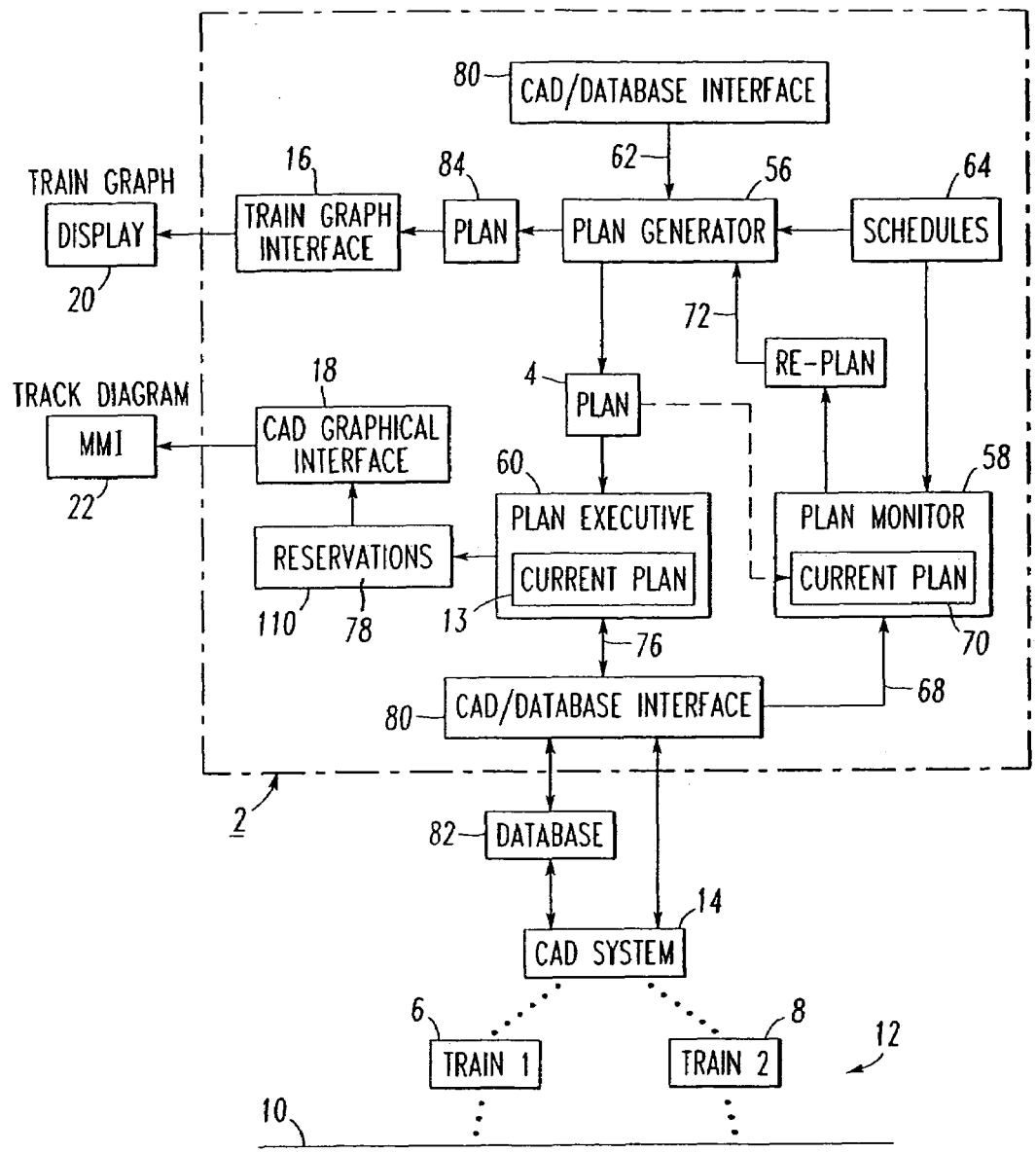
FIG. 1 is a block diagram in schematic form of a Dynamic Optimizing Traffic Planner (DOTP) in accordance with the present invention.

Referring to FIG. 1, a Dynamic Optimizing Traffic Planner system (DOTP) 2 is shown. The DOTP 2 is a software system that generates optimized movement plans, such as plan 4, for trains, such as 6,8, traveling across a railroad network 10 (e.g., a railroad track network) and then re-plans when the state of the railroad 12 differs to some degree from the state assumed by a currently executing movement plan 13. The state 68 of the railroad 12 is continuously monitored and the same is updated for the benefit of a plan generator 56 each planning cycle. The DOTP 2 may interface to a suitable traffic control system, such as a Computer-Aided Dispatching (CAD) system 14, which is responsible for controlling the movements of the trains 6,8 in real time. The DOTP 2 generates initial movement plans, in order to populate a solution pool 172 (FIG. 5A), and publishes an optimized movement plan, such as plan 4, when that system is started. After the DOTP 2 is running, that system continuously generates optimized movement plans, and also, dynamically re-plans using live data received from the field (e.g., the railroad 12), which data indicates the current state of the field. This automates the movement planning of the trains 6,8. The DOTP 2 may also advise (e.g., through interfaces 16 and 18, and train graph display 20 (e.g., a suitable server and user interface (not shown)) and (track diagram) man machine interface (MMI) display 22, respectively) humans who control the trains 6,8. Alternatively, the DOTP 2 may interface to any other suitable control system (not shown).

The DOTP 2 generates multiple solutions (movement plans) and recommends the "best" solution based on optimization criteria (objectives) against which it optimizes. Such criteria may, for example, be related to on-time performance, best time, minimizing overall delay, minimizing a business objective function discretized at location level or some combination of these and/or other optimization criteria. The specific criteria chosen depend on the business objectives of the particular railroad, such as 12. The DOTP 2 provides substantially improved operating efficiencies, typically in the form of increased capacity utilization coupled with better on-time performance, and, because it works to avoid congestion, will increase the level of safety by avoiding unsafe train configurations.

Dynamic, optimizing planning (which includes accounting for field changes) is a planning method that generates optimized movement plans (e.g., detailed meet/pass train plans) in a changing environment.

As employed herein, the term "reservation" shall expressly include, but not be limited to, the planned usage of a track section by a particular train from an entry date/time to an exit date/time. The entry date/time coincides with the entry of the first train car (e.g., lead locomotive; head of train) onto a particular track section. The exit date/time coincides with the exit of the last train car (e.g., end of train) from the particular track section. The reservation is a basic planning artifact. A certain time-based combination of all reservations for all planned trains makes up a movement plan.

EXAMPLE 1

The generation of movement plans observes various limitations (e.g., track speed limits; permanent speed limits; temporary speed limits) and constraints (e.g., train type, such as passenger versus freight; power type: diesel, AC, DC; train height, length, weight, width and other consist characteristics, such as, for example, dangerous goods). Also, movement plan generation observes intrinsic characteristics of the railroad devices and wayside equipment (e.g., switches and interchanges) that may further limit the generation of the movement plan. For example, the usage of a track section prohibits the usage of another track section that may or may not be connected. As another example, a track section that includes a switch in the normal position prevents the use of another track section that includes the same switch in the reverse position for a certain period of time that depends on the use of the former track section. A combination of switches in an interchange limits the use of certain track sections because of the conditions imposed by the wayside on different switches. For example, relatively wide trains using certain track sections may prevent the use of parallel track sections. These are conditions that any traffic plan generator should obey in order to produce executable plans. Also, all operational rules and constraints should be considered (e.g., some trains are not allowed over certain tracks; headway and train separation constraints; alternative platforms may be used). All these should be reflected in the set of reservations that make up the movement plan and planning boundary, which is discussed, below.

A reservation (for $train_j$ over $track_i$), a reservation set for a train service ($train_j$) and a movement plan (Plan) may be respectively represented by Equations 1, 2 and 3:

$$R_{track_i}^{train_j} = \{Train_j, Track_i, BeginDateTime_i^j, EndDateTime_i^j\}, \quad \text{(Eq. 1)}$$

$$R^{train_j} = \bigcup_{i=TrainPosTrack}^{FinalDestTrack} \{R_{track_i}^{train_j}\}, \text{ and} \quad \text{(Eq. 2)}$$

$$Plan = \bigcup_{j=1}^{n_{horizon}^{trains}} \{R_{track_i}^{train_j}\}; \quad \text{(Eq. 3)}$$

wherein:
$BeginDateTime_i^j = LocoEntryDateTime_i^j$,
$EndDateTime_i^j = EndTrainExitDateTime_i^j$, and
$n_{horizon}^{trains}$ is the number of trains in the interval (i.e., current time to planning horizon) that corresponds to the planning cycle when the movement plan was produced.

As shown above, the reservation set for a train service ($train_j$) contains all reservations for the track sections ($track_i$) starting from the current position (TrainPosTrack) to the last destination (FinalDestTrack) in the schedule. Reservation intervals for two consecutive reservations of a train service overlap as shown in Equation 4:

$$[BeginDateTime_i^j, EndDateTime_i^j]_i \cap [BeginDateTime_{i+1}^j, \quad \text{(Eq. 4)}$$
$$EndDateTime_{i+1}^j] = [LocoExitDateTime_i^j,$$
$$EndTrainExitDateTime_i^j]$$

wherein:
i and i+1 are two consecutive track sections.
$LocoExitDateTime_i^j$ represents the date and time when the first car (e.g., locomotive) of $train_j$ exits $track_i$, and
$EndTrainExitDateTime_i^j$ represents the date and time when the last car (e.g., end of train) of $train_j$ exits the same $track_i$.

Reservation intervals for two different train services (in the same track section) do not overlap unless the trains are permitted to occupy the same track section concurrently (e.g., according to the railroad's operational rules and constraints).

As employed herein, the term "planning cycle" represents an amount of time after which time a dynamic optimizing traffic planner, such as the DOTP 2, will take up-to-date field information (e.g., that it has been accumulating) and apply it to the generation of new plans; or represents the amount of time the planner uses to generate plans under the same traffic and traffic conditions. For example, the duration of the (regular) normal planning cycle may be less than the duration of a re-planning cycle. A re-planning cycle may interrupt the current planning cycle. At the end of the planning cycle, an optimized movement plan may be published, provided that it is better than the previously published plan by a given amount. On request, movement plans may be published before the end of the cycle.

As employed herein, the term "planning boundary" (or "deep planning boundary") shall expressly include, but not be limited to, a collection of former reservations under execution, committed reservations, and reservations that are expected to be committed during the next planning cycle.

As employed herein, the terms "repetitively generate" or "repetitively generating," shall expressly include, but not be limited to, the sequential and/or parallel generation of plural traffic movement plans within a corresponding planning cycle, period or window for a corresponding planning boundary.

EXAMPLE 2

Figure 9:
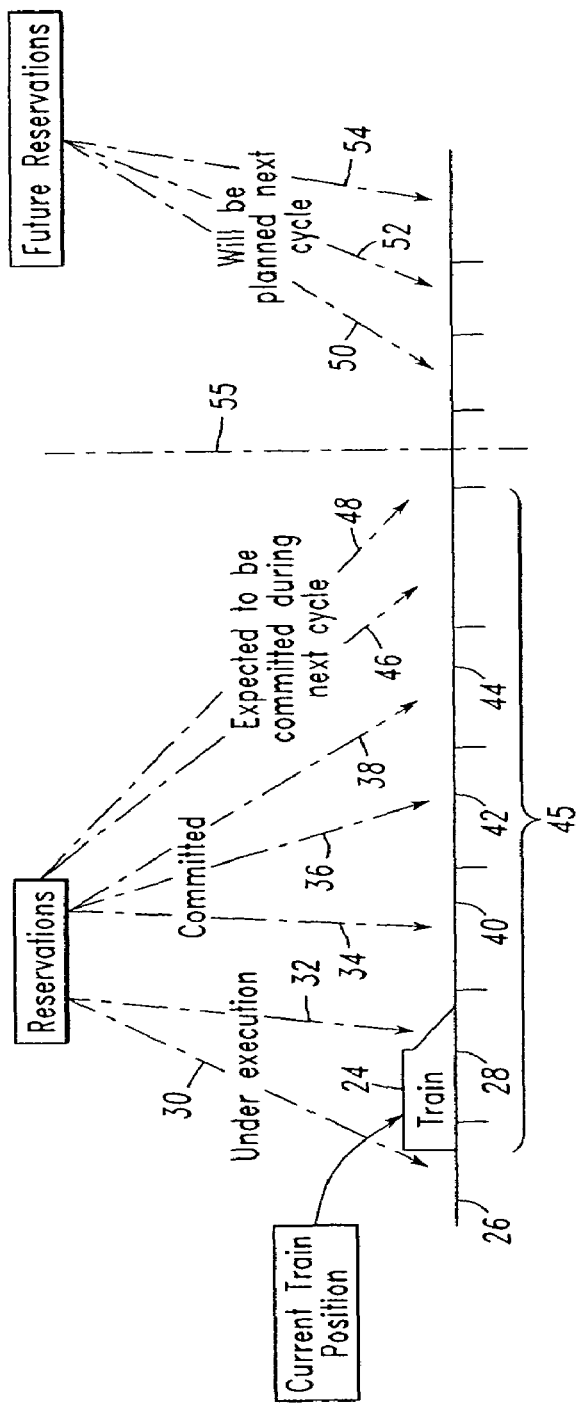
FIG. 9 shows an example of a planning boundary and various reservations.

For example, as shown in FIG. 9, various trains, such as train 24 (only one is shown), already occupy the track sections 26,28 of the reservations 30,32 under execution. The committed reservations 34,36,38 include reservations already allocated by the DOTP 2. Such committed reservations are not reversed by the DOTP 2; however, manual intervention may reverse them, assuming that it is safe to perform that operation. The trains are expected to move in the very near future according to these reservations and have been given "authority" to do so. In general, this means, for example, that signal lamps feature aspects that allow movement of the trains over the track sections 40,42,44 controlled by them. When trains are expected to continuously move, multiple reservations for each train may be included within this deep planning boundary 45. A train stop (e.g., at a station or because of traffic conditions) may cause a reduced number (e.g., down to zero) of committed reservations (and even expected to be committed reservations). As shown in FIG. 9, other reservations 46,48 are expected to be committed during the next planning cycle. Still other reservations 50,52,54 will be planned during the next planning cycle. The reservations 50,52,54 and all others to the end of the train service or to the planning horizon, which are outside the planning boundary, can be planned or modified during the next planning cycle.

As employed herein, the term "planning horizon" represents the point in time beyond the planning boundary to which a dynamic optimizing traffic planner, such as the DOTP 2 of FIG. 1, plans the movements of trains. The planning horizon (e.g., 55 of FIG. 9) may be any suitable point in time beyond the planning boundary. As a non-limiting example, the planning horizon may typically be between about one and about 24 hours from the current time, although a wide range of times is possible.

As employed herein, the term "traffic" shall expressly include, but not be limited to, railroad traffic, which consists primarily of freight trains and passenger trains, and commuter rail traffic, which consists primarily of passenger trains, although it can include freight trains.

As employed herein, the term "traffic conditions" shall expressly include, but not be limited to, state changes in traffic infrastructure, such as, for example, track blocks, switch blocks, speed restrictions and train position gaps (i.e., the gap between planned and actual train positions in a railroad network).

As employed herein, the term "current traffic conditions" shall expressly include, but not be limited to, a currently known and/or predicted state of the traffic conditions of a region as preferably determined for a suitable planning window, such as, for example, between the current time and a suitable planning horizon.

As employed herein, the term "re-planning score" (e.g., a numerical value) shall expressly include, but not be limited to, a numerical representation of changes to traffic conditions and schedule changes (schedule changes that are not close to the current time). For example, the contribution of different event types (changes) may be evaluated considering the specifics of each event type. The relative importance of each event type may be quantified by a corresponding weighting factor.

As employed herein, the term "special events" shall expressly include, but not be limited to, operationally significant traffic conditions, which are not part of the re-planning score; train order changes when arriving in the planned area; trains not following the prescribed movement plan; changes to train schedules effective close to the current time; and changes to the train consist (e.g., adding a car with dangerous goods; significant train length changes).

As employed herein, the term "re-planning cycle" shall expressly include, but not be limited to, a planning cycle triggered when the replanning score reaches a predetermined (e.g., configured) re-planning threshold or when certain special events occur. The re-planning threshold may be set based upon desired responsiveness to changes in the environment. Hence, if the traffic conditions sufficiently change such that the assumptions employed in the plan generation process are obsolete, then the planning cycle may be interrupted and a new planning boundary may be provided.

As employed herein, the term "objective function value" shall expressly include, but not be limited to, the "goodness" of a movement plan (eg., a relative indicator of how well a movement plan optimizes) as measured by the value(s) of the objective function(s) for that plan. A movement plan's objective function value reflects the goodness of the plan against the most recent state of the field. In a more complex environment, multiple objectives may be considered. If the objective functions are combined, a single value may represent the overall objective, in which case each objective is termed as a goal. When the objectives are not combined in one explicit overall objective, the objective function value may be replaced by a vector of objective function values. In this case, the fitness of the solutions (ie., movement plans) is determined by conditions expressed against this vector.

EXAMPLE 3

An example of an objective function is shown in Equation 5. The objective is to minimize the weighted lateness according to a global business objective function modeled discretely using evaluation points.

$$f = \sum_{j=1}^{m} \sum_{i=1}^{n_j} w_{ij} f_c(\tau_{ij}) \qquad (\text{Eq. 5})$$

wherein:
$w_{ij}$=f(date,time,direction) for each train service, with the function, f, being determined from the business objective (e.g., predetermined and presented to the planner in a configuration table);
$\tau_{ij}$=(−1)(scheduled time−actual time for evaluation point i of train j);
$n_j$ is the number of evaluation points (EPs) for train j, with each EP being a scheduled point (SP) in a relatively simple implementation. In other words, not all SPs have to be EPs: $\{\cup_i^{n_j} EP_i\} \subseteq \{\cup_i^{k_j} SP_j\}$. In a more sophisticated implementation, the EPs are not SPs, but are derived from them;
$k_j$ is number of scheduled points;
m is number of train services, each of which is scheduled for a physical train; and
$f_c$ is a local cost function depending on delay. In a simple case, $f_c(\tau_{ij})=\tau_{ij}$.

EXAMPLE 4

Equation 6 shows an example of an overall objective function including a plurality of individual goals.

$$F=F(f_1, f_2, \ldots f_n) \qquad (\text{Eq. 6})$$

wherein:
F is the overall objective;
$f_i$ is an individual goal of the overall objective;
n is the number of individual goals; and
i is between 1 and n.

EXAMPLE 5

Equation 7 shows a relatively simple example in which the overall objective combines the goals using a linear function, with different weightings assigned to different goals.

$$F(f_1, f_2, \ldots f_n) = \sum_{i=1}^{n} q_i f_i \qquad (\text{Eq. 7})$$

wherein:
$q_i$ is the weight of a corresponding goal.

The individual goals, $f_i$, may apply to different train groups. For example, one train group (i.e., a group of trains) may require on time arrival, while another train group may require best time to the final destination. However, different goals may also apply to a particular train group.

As employed herein, the terms "executing" and "execution" shall expressly include, but not be limited to, executing automatically, automatic execution, executing manually and manual execution. The automatic or manual execution is achieved with the support of a suitable traffic control system.

As employed herein, the term "commands" shall expressly include, but not be limited to, route clears and other control commands that are used to control the movements of trains. The currently executing movement plan is transformed into such control commands, which are sent to the field.

DOTP

Figure 3:
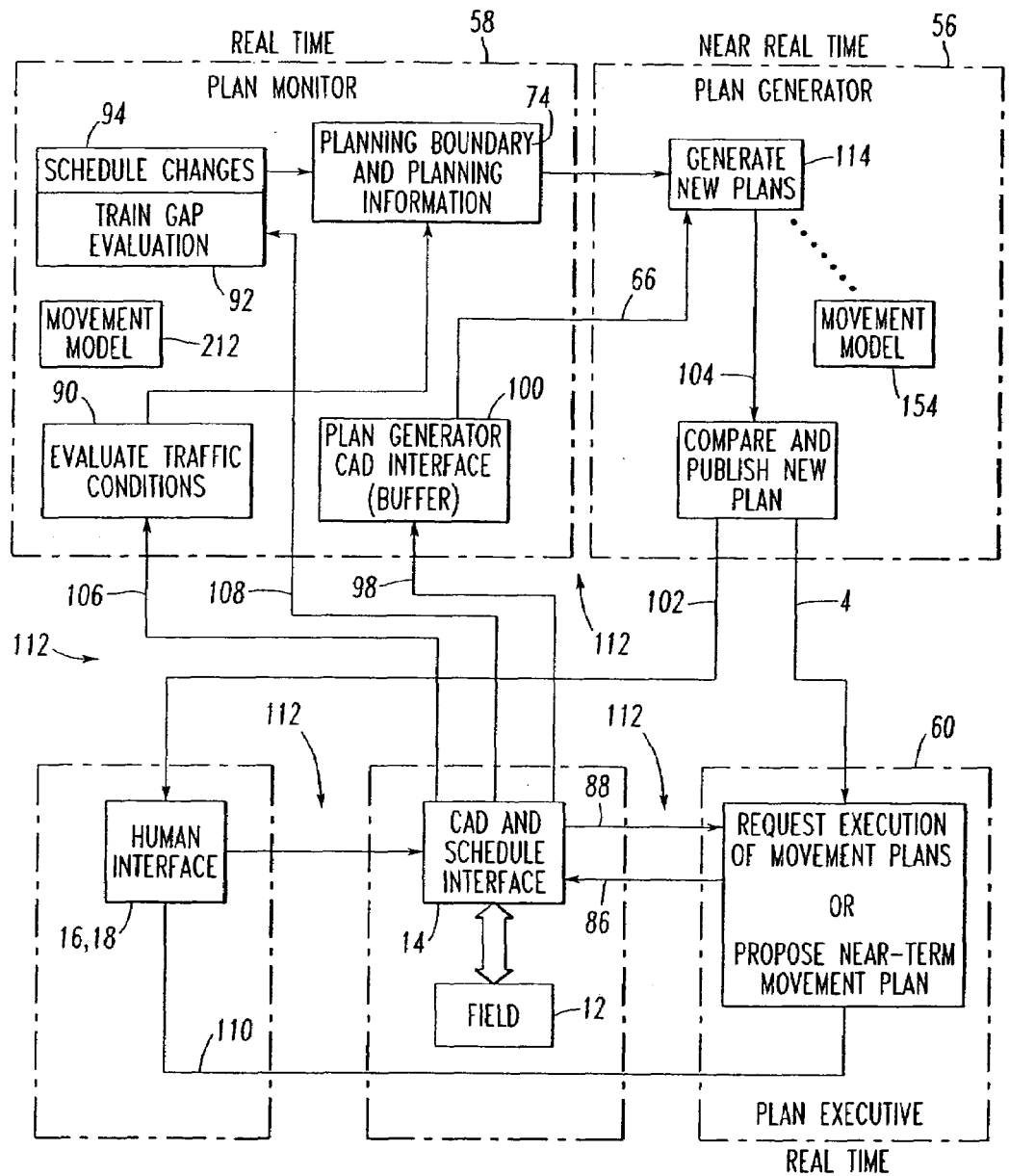
FIG. 3 is a block diagram in schematic form showing interfaces between the DOTP of FIG. 1 and a Computer-Aided Dispatching (CAD) system, with the DOTP being partitioned into real time and near real time components with interfaces therebetween.

Continuing to refer to FIG. 1, the DOTP 2 includes a plan generator 56, a plan monitor 58 and a plan executive 60. The plan generator 56 receives inputs 62 about the railroad 12 (e.g., track layout; speed limits); receives inputs 64 about train schedules; and generates optimized movement plans, such as plan 4, for the region it plans over. Also, as shown in FIG. 3, messages 66 pertaining to perturbations may be received by the plan generator 56 through the plan monitor 58 from the CAD system 14.

Figure 6:
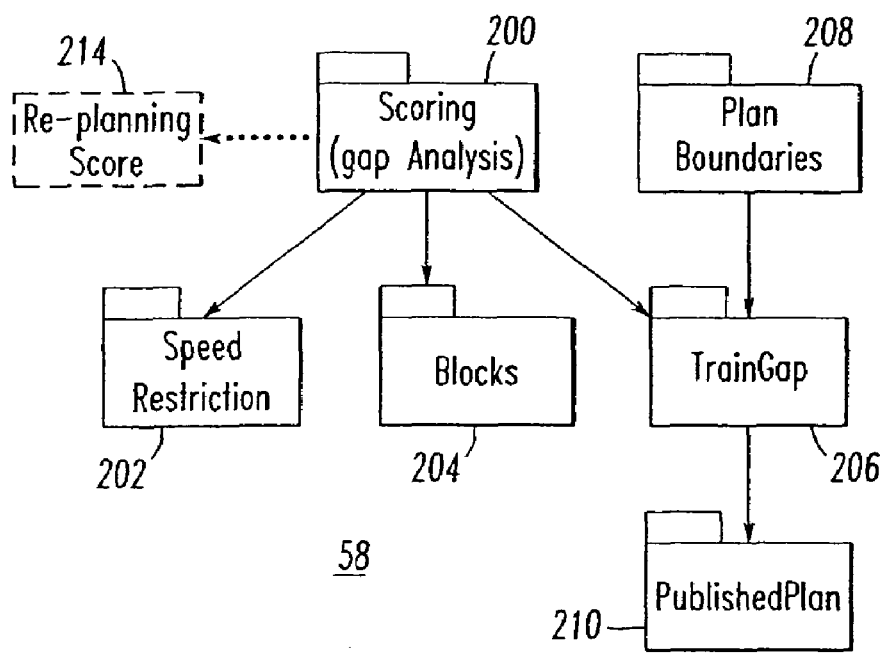
FIG. 6 is a block diagram of the plan monitor including modules related to the calculation of the re-planning score (for field changes) of FIG. 1.

The plan monitor 58 of FIG. 1, which is employed for dynamic planning, continually compares the current state 68 of the railroad 12 against the movement plan 70 that is currently executing (i.e., plan 13 of the plan executive 60), in order to determine if re-planning by the plan generator 56 is necessary. Re-planning may be triggered, at 72, by, for example, train delays, changes in the field 12 including track blocks and speed restrictions, or schedule changes. The plan monitor 58 performs a "gap analysis" (e.g., as discussed below in connection with FIGS. 6 and 7, and Equation 18) to define the planning boundary 74 (FIG. 3) and to calculate the re-planning score 214 (FIG. 6).

The plan executive 60 converts the current movement plan 13 into requests 76 for route clears and other control commands, in order that those commands can be executed by the CAD system 14. When manual execution is desired, the plan executive 60 provides the MMI 22 with a proposed set of reservations 78 for the near future. The proposed movement plan 110 (FIG. 3) is a subset of the current (or published) movement plan 4. It includes only a few track sections ahead of the committed reservations for a train, such as 6. Based on the reservations 78 of the proposed movement plan 110, a human operator may request route clears manually (e.g., requests submitted to the CAD system 14 via the MMI 22).

The plan generator 56, plan monitor 58 and plan executive 60 employ a database interface 80, which provides access to a rail infrastructure database 82 that contains representations of the infrastructure layout and control devices of the railroad network 10, and which may also provide direct access to the CAD system 14. The states of the devices that make up such network may also be maintained in the same database 82. In addition, the CAD system 14 provides indications that disseminate changes in device states.

The database interface 80 preferably handles different database implementations, thereby allowing the DOTP 2 to interface to different CAD systems (not shown) and/or other suitable control systems (not shown). To this end, the DOTP 2 preferably maintains internal representations of the main infrastructure and control devices, including, but not limited to, track sections, signals and switches. A separation component (not shown) may be added to the database interface 80, where needed, in order to interface and translate the information accessed in the database 82 into an internal representation. For example, the database interface 80 may access the infrastructure and control database supported by the CAD system of the assignee of the present invention, Union Switch & Signal, Inc. of Pittsburgh, Pa.

Figure 8:
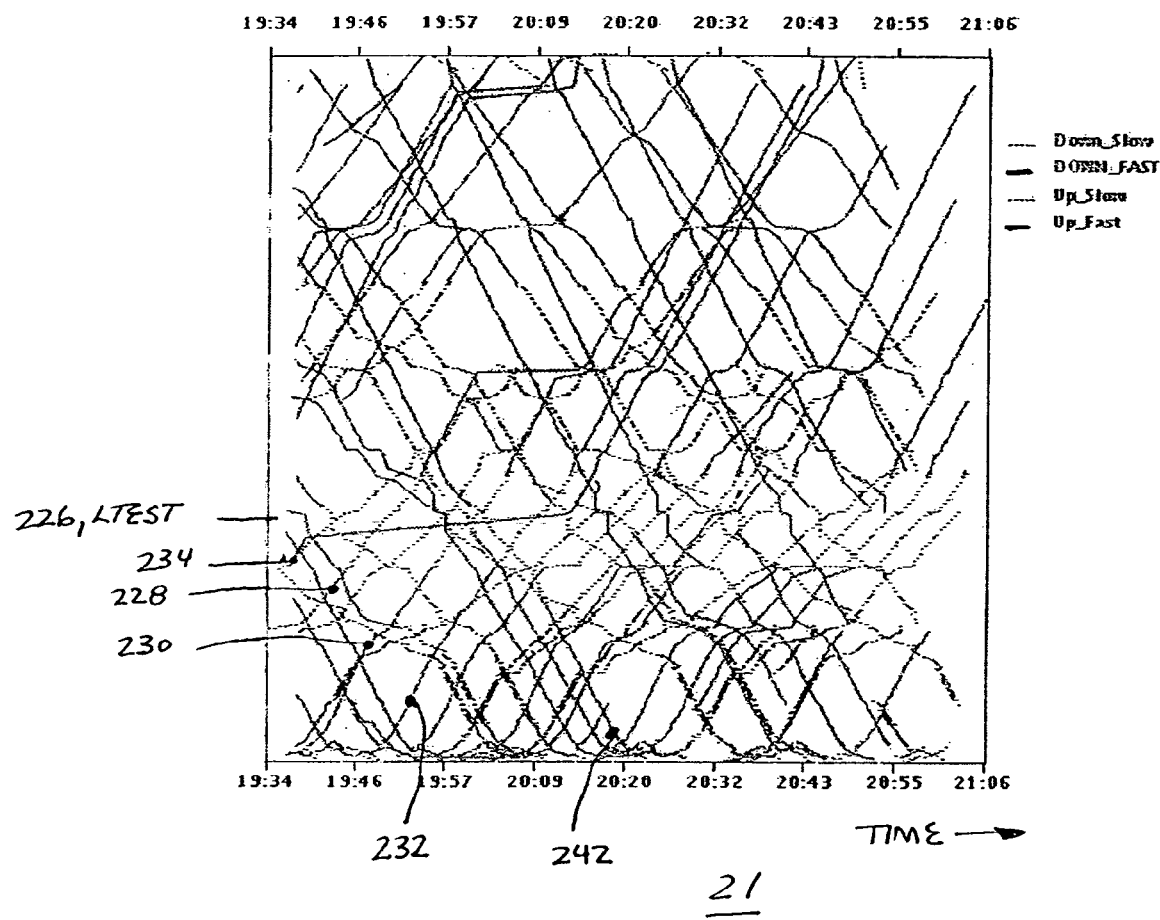
FIG. 8 is an example of a string-line train graph as output by the DOTP of FIG. 1 showing a movement plan that resulted from dynamically adding a track block.

The DOTP 2 preferably outputs movement plans to one or more human-machine interfaces, such as 16,18. For example, the train graph interface 16 provides to display 20 a time-distance (or "string-line") train graph representation, such as 21 (as shown in FIG. 8), of the planned movements of scheduled trains. The complete published movement plan 84, including all detailed location and time information needed for the time-distance representation, is sent to the display 20, which supports the train graph representation every time it is published. Also, the CAD graphical interface 18 provides a graphical (e.g., track diagram) representation (not shown) of the railroad infrastructure used to visualize train movements including the committed reservations. The plan executive 60 submits a short term set of the proposed reservations 78 (e.g., for a subset of trains or for all trains, such as 6,8) to the CAD graphical interface 18 when automated execution is not activated. The human operator at MMI 22 may use this information to manually submit needed commands to the CAD system 14 for execution.

Figure 2:
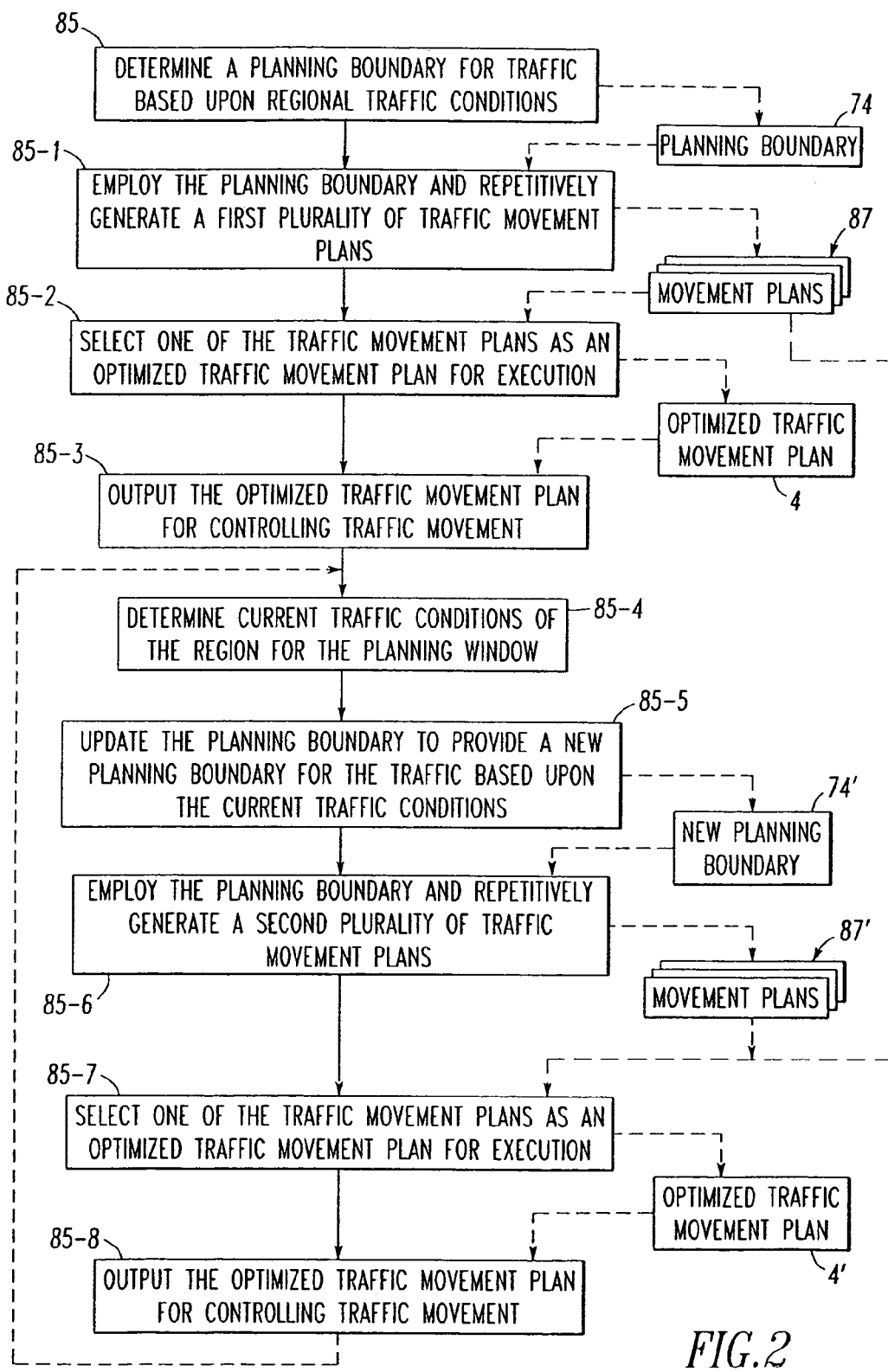
FIG. 2 is a block diagram of a method for generating optimized traffic movement plans in accordance with an embodiment of the invention.

FIG. 2 shows a method of generating optimized traffic movement plans, such as 4,4', for a region, such as railroad or field 12 (FIG. 1), having a plurality of traffic, such as 6,8 (FIG. 1), and a plurality of traffic conditions, such as 106 (FIG. 3). The method includes determining, at 85, a first planning boundary 74 for the traffic based upon the traffic conditions of the region. Next, at 85-1, the first planning boundary 74 is employed to repetitively generate a first plurality of traffic movement plans 87 for the traffic of the region. Then, at 85-2, one of the traffic movement plans 87 is selected as a first optimized traffic movement plan 4 for execution. Next, at 85-3, the first optimized traffic movement plan 4 is output for controlling traffic movement in the region. Then, at 85-4, the current traffic conditions of the region are determined for the planning window. Next, at 85-5, the first planning boundary 74 is updated to provide a new second planning boundary 74' for the traffic based upon the current traffic conditions. Then, at 85-6, the new second planning boundary 74' is employed to repetitively generate a second plurality of traffic movement plans 87' for the traffic of the region. Next, at 85-7, one of the traffic movement plans 87,87' is selected as a second optimized traffic movement plan 4' for execution. Then, at 85-8, the second optimized traffic movement plan 4' is output for controlling traffic movement in the region.

Step 85-4 through and including step 85-8 may then be repeated. For example, for normal planning cycles 132 (FIG. 4), a plurality of traffic conditions are employed with the optimized traffic movement plans 4,4', the current traffic conditions (from step 85-4) are compared against the corresponding traffic conditions as assumed by the optimized traffic movement plan (e.g., 4'), and planning is continued with the newly updated planning boundary (e.g., 74') based substantially upon the previous traffic movement plans, such as 87, to repetitively generate the subsequent traffic movement plans, such as 87'.

Alternatively, for re-planning cycles 152 (FIG. 4), when the current traffic conditions (from step 85-4) are significantly different from the corresponding traffic conditions as assumed by the optimized traffic movement plan (e.g., 4'), re-planning is responsively done with the newly updated planning boundary (e.g., 74') to repetitively generate: (a) a plurality (N1) of traffic movement plans 157 (FIG. 5A) based substantially upon some of the previous traffic movement plans, such as 87, and (b) a plurality (N2) of traffic movement plans, such as 174 (FIG. 5A), independent of the previous traffic movement plans.

Referring to FIG. 3, various data exchanges of the DOTP 2 of FIG. 1 are shown, including exchanges with the CAD system 14, which controls the field (e.g., railroad 12). In order to suitably perform tactical planning, the plan monitor 58 and plan executive 60 continuously monitor the field 12 through the CAD system 14 and perform their corresponding functions in real time. The plan executive 60 also receives the current movement plan 4 and implements (e.g., converts it into suitable commands 86) the same according to the information 88 (e.g., current traffic, traffic conditions and state of the field devices) as input from the CAD system 14. This real time aspect suitably controls the train movements.

The plan monitor 58 evaluates traffic conditions, at 90, train positions versus the movement plan 4, at 92, and train schedule changes, at 94, and requests re-planning (as shown at 72 of FIG. 1) by the plan generator 56, if needed. The current planning cycle is then preempted when re-planning is needed. The plan monitor 58 prepares the planning boundary 74 for the regular (normal) planning cycles as well as for re-planning cycles and re-planning information for re-planning cycles. Basic data employed for a (normal) planning cycle (or a re-planning cycle) is packaged in the planning boundary 74. Additional information 98, including, but not limited to, detailed traffic conditions information, such as location and duration of blocks and speed restrictions or schedule changes, from the CAD system 14 is buffered in a CAD interface component 100 and is forwarded, as messages 66, to the plan generator 56 at the beginning of the planning cycle. At the end of the planning cycle, the selected movement plan 4 is published for execution through the plan executive 60, which provides a suitable gateway for automatic and/or manual execution of the selected movement plan 4. Also, at 102, the same movement plan is published for visualization through the human interface 16. The plan monitor 58 also receives the published plan (not shown) and may control the execution of the plan for certain trains, if needed (not shown).

The plan generator 56 receives data employed for planning in the form of the planning boundary 74, which is based on the current schedule, and the state of the field 12 at the beginning of the planning cycle. For the rest of the planning cycle, a plurality of movement plans 104 are produced based on this information. Here, true "real time" response is not possible due to the relatively intensive computations employed to produce a planning solution. Although the planning boundary 74 and the CAD interface (buffer) 100 are shown with the plan monitor 58, one or both may be part of the plan generator 56.

EXAMPLE 6

A planning cycle should support calculation of a meaningful number of planning solutions, such as movement plans 104. For example, for up to 100 trains and for various planning horizons (e.g., from about one to about 24 hours; the planning horizon is defined based on the complexity of the infrastructure of the corresponding region such as railroad 12 of FIG. 1), the determination of one solution may take, for example, less than about two seconds. Hence, normal planning cycles may take about 30 seconds to about one minute. Therefore, the DOTP 2 preferably optimizes train movements in a relatively very short period of time (e.g., within one or a couple of minutes) when planning or re-planning, thereby enabling it to dynamically plan. These times may be reduced by reducing the planning horizon, the region size and/or by employing relatively more powerful hardware and/or parallel processing.

In summary, the DOTP 2 considers changes to the field 12 when producing or updating the movement plans 104. Moreover, the DOTP 2 communicates with the CAD system 14 or other suitable control system (not shown) both to receive updated field information, such as traffic conditions 106 and 98, train positions 108 and states of infrastructure devices 98, and to send control commands 86, and/or a proposed near term movement plan 110, which are generated from the currently executing movement plan 13 (FIG. 1). For example, the information exchange may take place using a suitable messaging system 112 between the CAD system 14 or MMI 22/Train Graph display 20 and the plan monitor 58 and plan executive 60. The same messaging system 112, a similar one, or any other suitable communication mechanism (e.g., shared memory) may be used between the plan monitor 58 and plan generator 56.

Figure 4:
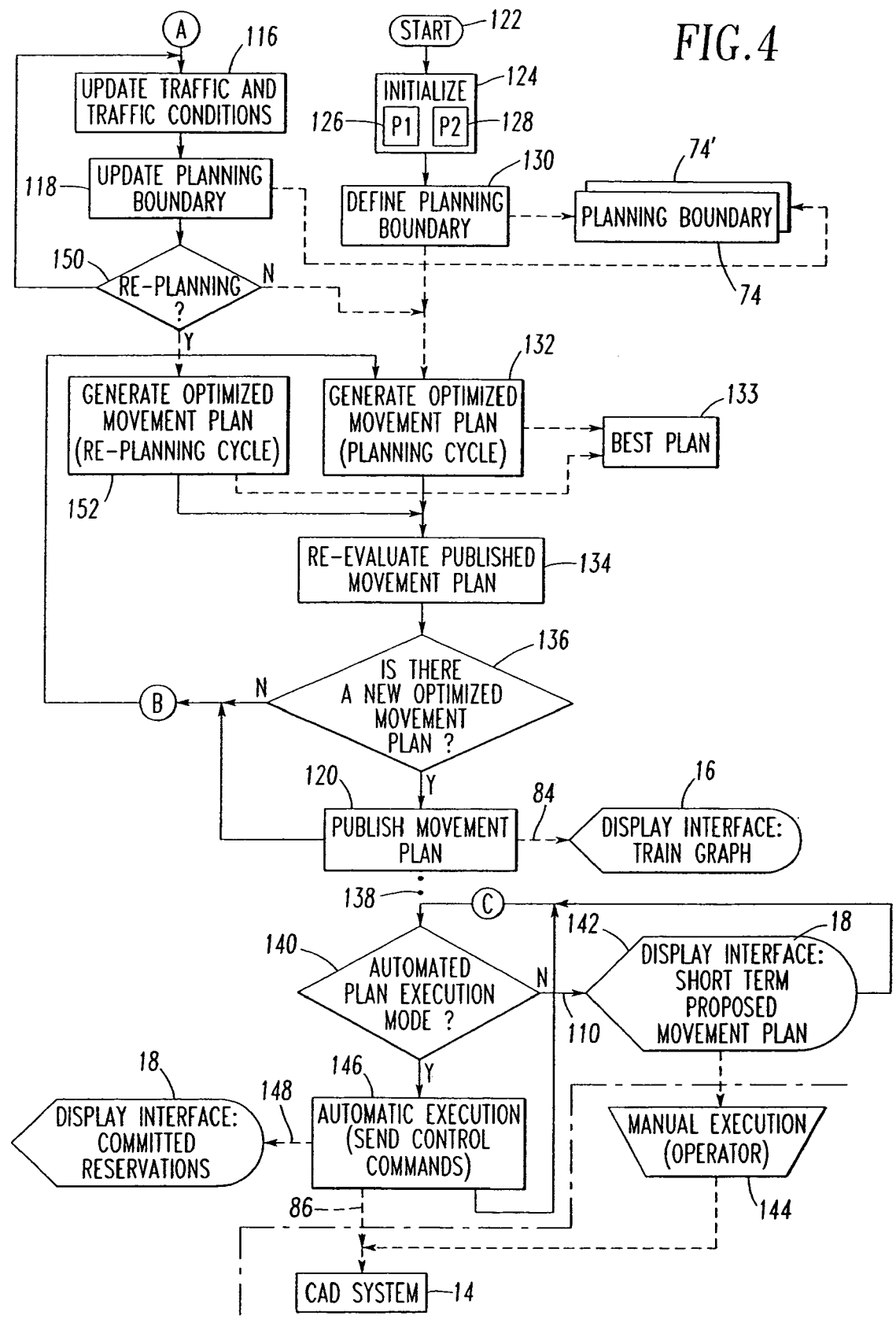
FIG. 4 is a flowchart of actions of the plan generator, plan monitor, plan executive and CAD system of FIG. 3.

FIG. 4 shows the sequence of actions employed by the DOTP 2 and CAD system 14 of FIG. 3. The generation of solutions (i.e., the traffic movement plans 104 of FIG. 3), at 114 of FIG. 3, by the plan generator 56 is generally continuous and is punctuated by updates to traffic and traffic conditions, at 116, and updates to the planning boundary 74, at 118. When conditions are met, a new movement plan, such as 4 of FIG. 3, is published by the plan generator 56, at 120. This selected movement plan 4 provides a better solution than a previously executing movement plan (not shown) according to the criteria established in one or more objective functions (e.g., derived from business objective(s)).

Continuing to refer to FIG. 4, the DOTP 2 (FIG. 1) starts execution at 122, after which the plan generator 56 and plan monitor 58 initialize at 124. For example, the DOTP 2 may include a first processor (P1) 126 for the plan monitor 58 and plan generator 56, and a second processor (P2) 128 for the plan executive 60. Alternatively, one or more processors (not shown) may execute routines for the plan generator 56, a single processor (not shown) for the plan monitor 58 and a single processor (not shown) for the plan executive 60; or three processors (not shown) may execute routines for the plan generator 56, plan monitor 58 and plan executive 60. After initialization, the plan monitor 58 defines the planning boundary 74 at 130.

For convenience of illustration, FIG. 4 shows data and processing activities, but does not show concurrent processing that takes place. The plan monitor 58 performs the activities at 116, 118, 130, 150 and 124. The plan generator 56 performs activities at 132, 152, 134, 136, 120 and 124. The plan executive 60 performs activities at 140 and 146. With the exception of synchronizing when the plan monitor is 58 sending the new boundary and traffic conditions and receiving a new plan (at the beginning of a new cycle and at the end of the prior cycle) to/from the plan generator 56, the plan monitor 58 and plan generator 56 work asynchronously. The plan executive 60 is completely asynchronous compared to the other two components and responds to events, such as the arrival of new published plans.

Next, at 132, the plan generator 56 undertakes a normal planning cycle. As will be discussed in greater detail below in connection with FIGS. 5A-5B, the plan generator 56 generates the plural movement plans 104 (FIG. 3) and selects a "best" plan 133 for further evaluation. Next, at 134, the plan generator 56 re-evaluates the previously published movement plan 4 (FIG. 3) using the most recent update of the planning boundary 74. This is because the published movement plan 4 may have been executing for a period of time, which is sufficiently greater than the normal planning cycle. Next, at 136, the plan generator 56 determines whether there is a new optimized movement plan. For example, the best plan 133 and the published movement plan 4 (FIG. 3) may be evaluated, under current conditions, by a suitable objective function, for example, as is discussed above in connection with Equations 5-7 or below in connection with FIGS. 5A-5B. Then, if the objective function value of the best plan 133 is better (e.g., smaller when minimizing the objective function) than the objective function value of the published plan plus (or minus, when minimizing) a suitable threshold value (e.g., 3%; a suitable value that reduces the number of published plan changes to allow for a more stable environment for the benefit of human operators) of the published movement plan 4, then a new plan 4' is published, at 120, for execution provided the above condition is met. Also, this plan 84, in the form of a train graph, is output to the train graph interface 16. For initial execution, there is no previously published movement plan, and the best plan 133 is published at 120. During the initialization, the initial solution pool 104 (FIG. 3) is created by employing initial planning boundary information. If the initialization process is longer than the period of a normal planning cycle, then the planning boundary 74 may be updated, while generating the initial solution pool 104.

At the end of either of the normal planning cycle 132 or re-planning cycle 152, the "best" plan 133 is published, at 120, if it is better (e.g., by employing the f value of Equation 5, above) than the currently executing movement plan 13 (FIG. 3) by a predetermined (e.g., configurable) relative amount. The newly published plan 4' is sent out for execution in a suitable format 138 including data employed by the plan executive 60 (FIG. 3). The same plan (70 of FIG. 1) is received by the plan monitor 58 and is employed to determine and maintain the new planning boundary 74'. Then, the planning cycle is restarted, at 132, with new boundary conditions while the published plan, if any, is considered by the plan executive 60 (as is discussed below).

In response to the newly published plan 4', the plan executive 60 (FIG. 3) determines the execution mode of the region. For example, the plan executive 60 determines states associated to the region, the trains and elements of the infrastructure. The whole region may be in manual execution mode, some services may be in manual execution mode, and/or some signals may be in manual execution mode. Furthermore, the plan executive 60 handles a partial automatic execution mode (at train plan or track section level). Some trains may be considered in a manual execution mode. Even when the train is in automatic execution mode, some commands are issued manually, based on the proposed near-term movement plan 110 (FIG. 3). In manual execution mode, the corresponding proposed movement plan (e.g., selective; near-term) 110 (FIG. 3) is output, at 142, to the CAD graphical interface 18 for manual execution, at 144, by the human operator. Otherwise, if there is automatic plan execution, as determined at 140, then the corresponding commands 86 are output, at 146, to the CAD system 14. Also, committed reservations 148 are output to the CAD graphical interface 18.

Concurrently, the plan monitor 58 updates, at 116, traffic and traffic conditions from the CAD system 14 and updates, at 118, the planning boundary 74. Next, at 150, the plan monitor 58 determines whether re-planning is needed. For example, as was discussed above in connection with FIG. 1, the plan monitor 58 continually compares the current state 68 of the railroad 12 against the movement plan 70 that is currently executing in order to determine if re-planning by the plan generator 56 is necessary. If re-planning is triggered, at 72 (FIG. 1), then the normal planning cycle 132 of the plan generator 56 is interrupted, and is replaced by a re-planning cycle (as is discussed below in connection with FIGS. 5A-5B), at 152. On the other hand, if re-planning is not triggered, then the normal planning cycle (as is discussed below in connection with FIGS. 5A-5B) of the plan generator 56 continues at 132.

Plan Generator

Referring to FIGS. 3,4 and 5A-5B, the DOTP 2 receives and processes updates from the field 12 or office (not shown), including, for example, train positions 108, traffic conditions 106, such as track blocks and speed restrictions, train schedules 64 (FIG. 1) and train properties added because of the advancing of the planning horizon or changes within the planning horizon.

The plan generator 56 generates plural movement plans 104 (FIG. 3) for a configurable time window beginning at the current system time out to the planning horizon. The generation of these plans 104 is cyclic, with each cycle attempting to improve existing plans and each cycle processing the new state of the field 12. Following the updates, the DOTP 2 either: (1) continues the normal planning cycle at 132 of FIG. 4; or (2) undertakes a replanning cycle at 152, depending on the changes in the state of the field 12 and the train schedules 64.

The plan generator 56 constructs plural detailed movement plans 104 (FIG. 3) for trains over a specified time interval. These movement plans 104 are feasible plans (i.e., feasible plans do not violate any constraints and do not have any unresolved conflicts between trains for any section of track; there are no deadlocks) based on data for the trackage planned over.

At the beginning of the normal planning cycle, the planning boundary 74 (FIG. 3) is forwarded to the plan generator 56. Additional data (e.g., traffic conditions 106, such as detailed data for temporary speed restrictions and device blocks) from the messages buffered by the plan monitor 58 and forwarded at the beginning of the normal planning cycle also may be employed in the process of movement plan generation. The planning boundary 74 is actively maintained by the plan monitor 58. Hence, the published movement plan 4 (FIG. 3) satisfies the current conditions at publication time. If the boundary conditions change in such a way that the assumptions used in the plan generation process 114 (FIG. 3) are obsolete, then the normal planning cycle is interrupted, at 72 of FIG. 1, and a new planning boundary 74' is provided, at 118 of FIG. 4.

As shown in FIG. 3, the plan generator 56 employs a movement model 154 to calculate the time a train needs to transverse a particular section of track. The movement model 154 computes the run time using train characteristics, infrastructure information, terrain information and perturbations from messages 66 (FIG. 3) (e.g., temporary speed restrictions and track blocks). The dynamic changes in traffic conditions are observed and considered by the plan generator 56. Some of the changes (e.g., temporary or emergency speed restrictions) are addressed by the movement model 154.

The plan generator 56 employs the following procedures to solve the generation and delivery of plans in a dynamic environment: (1) re-planning 156,158 (FIG. 5A) according to the importance of the change in the field 12 (FIG. 3); (2) maintaining a multi-generation pool 172,172',172" (FIG. 5A) of solutions; (3) evaluating and comparing movement plans based on the current planning boundary 74,74' (FIG.

4), and traffic and traffic conditions (as discussed above in connection with 134,136,120 of FIG. 4); and (4) upgrading solutions based on new services and the new planning boundary 74'.

Figure 5A:
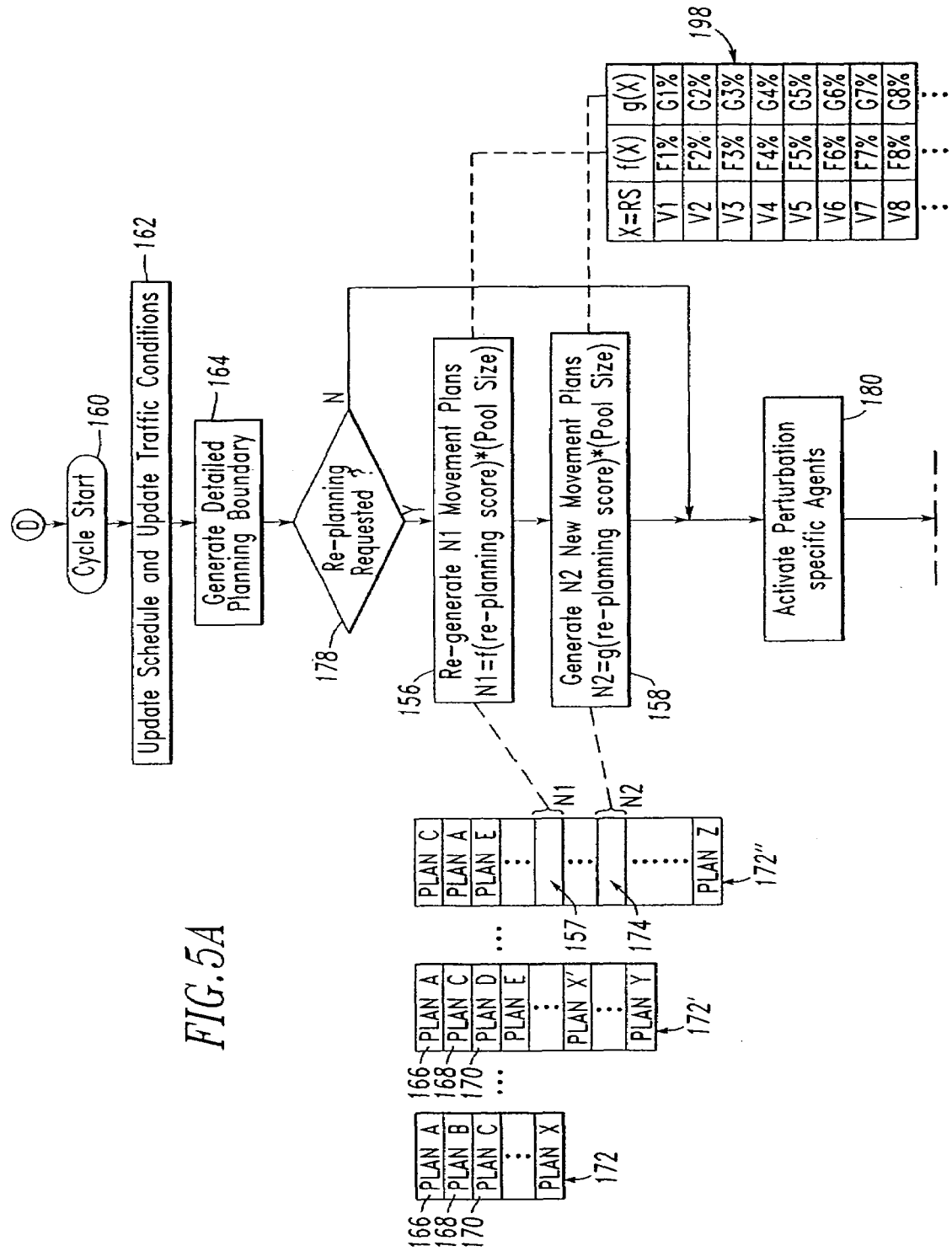
FIGS. 5A-5B form a flowchart showing the planning and re-planning cycles of FIG. 4.
Figure 5B:
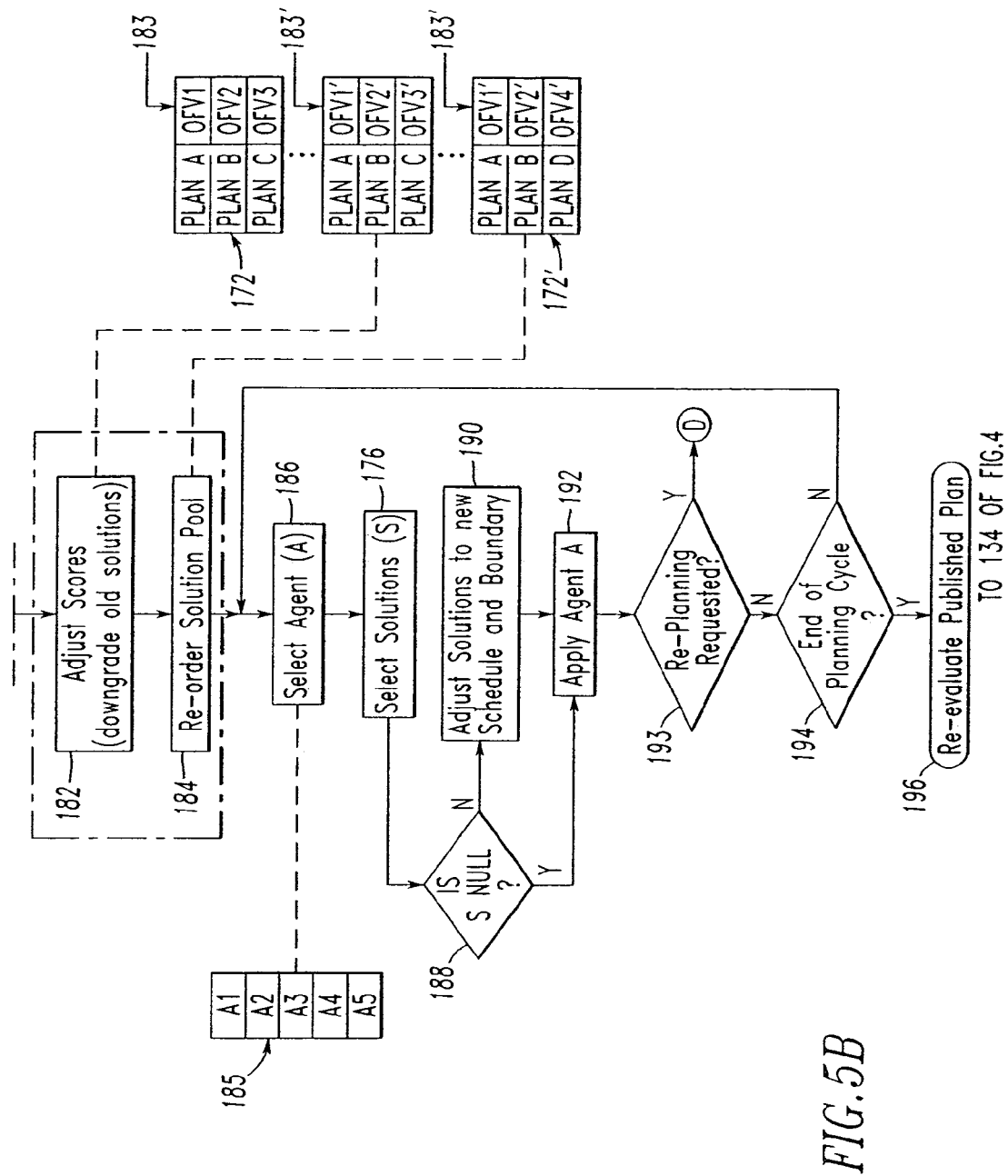

Referring to FIGS. 5A-5B, both the normal planning cycle and the re-planning cycle are shown. In general, the re-planning cycle is the same as the normal planning cycle, except that the re-planning cycle also includes steps 156 and 158. An initial planning cycle (cold start) (not shown) is similar to the re-planning cycle, but includes only step 158.

Producing an initial solution, or modifying or destroying a solution, may be implemented by the action of a suitable "agent" (e.g., such as agents 185). In addition, re-generation, at 156, may be employed to adapt (as is discussed, below) an existing solution, in order to consider some new events. Each time a solution is produced, modified, or re-generated, it is evaluated using the objective function, which is employed to order the pool 172 of solutions (including, e.g., movement plans 166,168,170). Hence, the solution is preferably inserted at its properly ordered place in the pool 172 immediately after evaluation.

The ordering or ranking is done, in order that relatively lower objective function values may be deemed to be better than relatively higher objective function values, such that the solution having the lowest objective function value (e.g., the "best" plan 133 of FIG. 4) may tentatively be deemed, at 132 or 152 of FIG. 4, to be "best" and, thus, placed at one extreme (e.g., top; bottom) of the solution pool 172. Although minimization is disclosed, alternatively, relatively higher objective function values may be deemed to be better than relatively lower objective function values, such that the solution having the highest objective function value may tentatively be deemed to be "best" and, thus, placed at one extreme (e.g., top; bottom) of the pool 172.

The planning cycle starts at 160 and is followed by updating of train schedules 64 (FIG. 1) and updating the internal state with the new traffic conditions, at 162, and generating the detailed planning boundary, at 164. The planning boundary 74 (FIG. 3) provides the plan generator 56 with points in space and time for each train from where the plans should be provided. It also provides additional limitations imposed by the committed reservations. The reservations expected to be committed impose similar constraints with committed reservations. For example, the train schedules 64 (FIG. 1) may include changes, such as, for example, new trains being added, trains being removed or the journey finished, new destinations for trains being added, existing destinations for trains being deleted or completed, or changes to the train consist. More details may be added to the planning boundary 74 if not already determined by the plan monitor 58 (including head of the train exit time and speed when trains exit the last reservations in the boundary), in order to help to support generation and re-generation of the movement plans. Hence, the trains schedules 64 and the detailed planning boundary are updated before solutions (e.g., movement plans 166,168,170) in the solution pool 172 are modified or re-generated, and before new solutions (e.g., movement plans 174) are generated by the re-planning cycle (i.e., at step 158) or, perhaps, by the normal planning cycle (i.e., at some executions of steps 176,190,192). Next, at 178, it is determined if re-planning is requested, as was determined at 150 of FIG. 4. If not, then the normal planning cycle continues at 180. On the other hand, if re-planning is requested, then steps 156 and 158 are executed before a subsequent normal planning cycle is executed at 180.

At 156, a plurality (e.g., a count of N1) of movement plans 157 from the existing pool of solutions (e.g., solution pool 172') are re-generated. For example, the top N1 best solutions may be employed. Alternatively, in addition to those solutions, one or more solutions may be chosen at random. For example, the count, N1, may be determined as a function (e.g., f(re-planning score) in Equation 8, below) of the re-planning score (e.g., from Equations 18 or 20, below) times the count of solutions (e.g., Pool Size) in the solution pool 172'.

The main reason for activities that are specific to the re-planning cycle is to deal with changes in the field 12 (FIG. 3) or an input that caused a re-planning cycle to happen. The re-generation of a movement plan accounts for major schedule changes and perturbations in the field. The re-generation process starts from an existing movement plan and attempts to adapt it according to the new situation in the field and input. At the very least, the new conditions are accounted for and, if possible, the perturbation is solved within the outline of the given solution (e.g., a speed restriction is dealt with by changing the corresponding reservation intervals or by diverting the trains without major changes to the overall movement plan; all other reservations are adjusted accordingly). In addition to the main goal of the re-generation, based upon the new schedule and boundary conditions, at least some of the solutions may need adjustment of at least a portion of their existing reservations (e.g., as it is done for all solutions that are employed in a normal planning cycle). Those re-generated solutions are shown at 157 of solution pool 172".

When the individual objective function values (OMFs) (e.g., OFVI, OFV2, OFV3) are determined, which is preferably immediately after generation or re-generation of any one solution, the solutions are preferably individually suitably dispersed, in the existing pool, such as 172,172'.

Next, at 158, a plurality (e.g., a count of N2) of new movement plans (e.g., 174) are generated from scratch as part of the same pool of solutions (e.g., updated solution pool 172"). For example, the count, N2, may be determined as a function (e.g., g(re-planning score) in Equation 9, below) of the re-planning score (e.g., from Equations 18 or 20, below) times the count of solutions (e.g., Pool Size) in the solution pool 172'.

The example re-planning strategy (FIGS. 5A-5B) depends on the re-planning score 214 (FIG. 6) computed by the plan monitor 58 and/or on various perturbation types (e.g., some of the messages 66 of FIG. 3) that caused re-planning. In turn, suitable algorithms are applied for each perturbation type at 180. As was discussed above, the existing solution pool 172' is modified when re-planning by re-generating, at 156, a count N1 of the best existing solutions in the solution pool 172' to satisfy the new conditions as determined at 162,164, and generating a count N2 of new solutions 174 (i.e., which are not based on existing older solutions, such as 166,168,170), at 158. The solutions 157,174 are preferably ranked within the pool 172" as each solution is generated or re-generated.

EXAMPLE 7

Equations 8 and 9 respectively show the determination of two 5 associated functions to determine the count N1 (=f(replanning score)*Pool Size) of solutions to be re-generated and the count N2 (=g(replanning score)*Pool Size) of solutions to be newly generated based upon the re-planning score.

$$f(\text{replanning score}) = \qquad \text{(Eq. 8)}$$
$$k_1 * \frac{\text{replanning score} - \text{replanning threshold}}{\max(\text{replanning score}) - \text{replanning threshold}}$$

$$g(\text{replanning score}) = \qquad \text{(Eq. 9)}$$
$$k_2 * \frac{\text{replanning score} - \text{replanning threshold}}{\max(\text{replanning score}) - \text{replanning threshold}}$$

wherein:

$k_1+k_2=1;$ replanning threshold is the threshold of step 150 of FIG. 4; and max(replanning score) is a predetermined, maximum value of the replanning score, such that scores beyond this value are assigned this limit.

Preferably, the calibration of the specific weights in Equations 18 and 20, below, ensures that:

$f(\text{replanning score})+g(\text{replanning score})<0.5$ (Eq. 10)

when no schedule changes are present.

EXAMPLE 8

For example, the functions f(re-planning score) and g(re-planning score) may be determined from a suitable discrete mapping 198 of x=re-planning score (RS), f(x) and g(x), as shown in FIG. 5A.

EXAMPLE 9

Alternatively, any suitable discrete, continuous, linear or non-linear equation, function or mapping may be employed to relate the counts N1 and N2 to the re-planning score and the size of the current solution pool (e.g., 172').

The plan generator 56 may employ any suitable generator of movement plans, which is able to produce such plans in a timely manner, such as, for example, collaborative computation using multiple algorithms, branch and bound techniques, and/or any recursive or iterative method searching the solution space. Even when the method of generation does not rely on a solution pool when optimizing off-line (i.e., non-dynamically), a solution pool may be populated by using movement plans constructed at different points in time.

Of course, when the re-planning score (e.g., from Equations 18 or 20, below) is below a suitable threshold, and in the absence of special events, re-planning is not initiated, as was discussed above in connection with step 150 of FIG. 4. Also, when re-planning is initiated, relatively small percentage values of N1 and N2 are provided for relatively small values of the re-planning score, and relatively large percentage values of N1 and N2 are provided for relatively large values of the re-planning score.

After 158 or if re-planning was not requested, at 180, various perturbation specific agents (algorithms) 185 are activated. Later, such agents 185 may be employed to address conditions, such as, for example, blocks, at 186. Although some perturbations may rise to the level of special events, which trigger re-planning, other perturbations may not rise to that level, such that activation of specific agents may be performed even for a normal planning cycle. These agents attempt to modify an existing solution to account for a given event type. The outline of the solution may change as a result (e.g., which is different from re-generation that attempts to account for events within the original outline).

Next, at 182, the objective function values 183 of the current pool of solutions (e.g., pool 172 prior to the next planning cycle; pool 172" following steps 156,158) are adjusted (e.g., by employing Equation 11, below), in order to downgrade relatively older solutions as shown with objective function values 183'. The solutions produced in steps 156,158 are current and should not be downgraded. Then, at 184, the current pool of solutions (e.g., pool 172; 172') is reordered based upon the newly established objective function values 183'. Steps 182 and 184 are preferably applied solution by solution rather than by adjusting all solutions and then re-ordering all solutions. The plans in the pool 172 are evaluated to determine the best plan 133 (FIG. 4) by one or more corresponding objective functions, which may include, for example, objectives such as minimum total minutes late and best time to the final destination.

In this dynamic planning environment, the pool 172 of movement plans (i.e., solutions) is a multi-generation pool. These solutions (e.g., plans 166,168,170) in the pool 172 are updated for the new planning boundary 74' (FIG. 4) any time they are modified or proposed for execution. Also, when the schedule 64 of FIG. 1 is updated, because of adding or removing services, the solutions in the pool 172 are upgraded according to the new train schedule.

The objective function value of older solutions may be altered according to Equations 11 and 12, below. This shows that solutions that were not recently involved in the generation of the movement plans 104 (FIG. 3) are downgraded (e.g., their objective function value is increased in Equation 11 because a solution, in this example, is better when its objective function value is lower and the plan generator 56 minimizes the objective function). The solutions that are older than the time window defined by the planning horizon are preferably eliminated (i.e., destroyed) from the pool 172.

EXAMPLE 10

Regeneration may be done for best plans after downgrading. In this example, steps 182 and 184 of FIG. 5B are preferably implemented right after (not shown) step 164 of FIG. 5A. Preferably, the downgrading is performed at the beginning of the planning cycle, in order that the newly downgraded objective function values are available for activities that employ such values. For example, the best plans in the pool 172 are selected for re-generation at 156.

Next, at 186 of FIG. 5B, a suitable agent is selected, using a suitable method (e.g., without limitation, weighted random selection) that is appropriate to the plan generation being employed, from the list of agents 185, and, at 176, one (or more) of the solutions from the adjusted pool of solutions 172' is selected, using a method (e.g., considering the objective function values of the solutions in the pool 172; a weighted random selection employing objective function values) that is appropriate to the plan generation being employed, if the agent requires such one (or more) solutions. The list of agents 185 may include, for example, agent A1, which destroys certain solutions based upon downgraded (if needed) objective function values, or similarity of solutions; agent A2, which modifies a solution, in order to attempt to improve its objective function value; agent A3, which uses multiple solutions to generate a new one; agent A4, which attempts to solve perturbations, such as track blocks or speed restrictions; and agent A5, which generates new solutions without using existing solutions.

EXAMPLE 11

As has been disclosed, existing solutions are employed to come up with new solutions. Suitable agent and solution selection may facilitate the adjusting and adapting of multiple solutions and increase the chance of finding out a new optimized plan. In some plan generation cases, there is only one "agent" (A2) that does nothing else but adjusting and adapting, and only one agent (A5) that produces new plans without considering existing ones. Suitable approaches may employ all of the agents A1-A5 of the list of agents 185.

Then, at 188, it is determined if the selected solution(s) from 176 is (are) null. This occurs if an existing solution is not needed by the selected agent from 186. If not null, then the selected solutions may be adjusted, at 190, to the new schedule, from step 162, and to the new planning boundary, from step 164. The movement plans (solutions) chosen may need to account for new or changed elements of the schedule before being used by the agents 185. Partial plans are developed for the new schedule elements. Parts of the movement plans corresponding to schedule elements that were removed are also removed from the movement plan.

The changes in the planning boundary 74 (FIG. 3) may require certain movement plans to be adjusted by removing a partial plan for track sections that belong to network branches that do not correspond with the current planning boundary.

EXAMPLE 12

Figure 10:
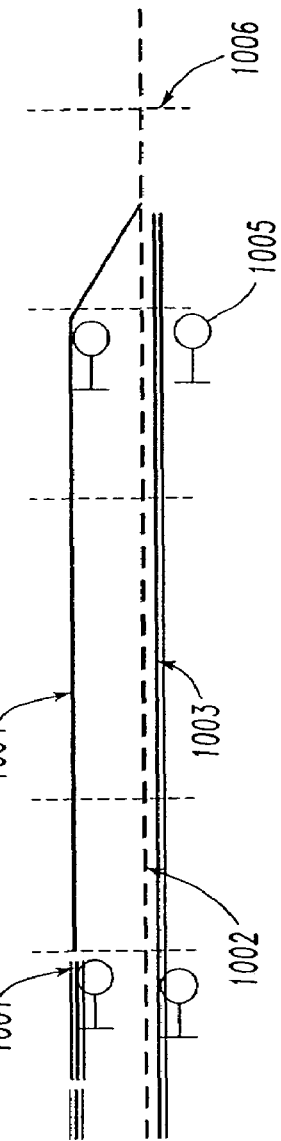
FIG. 10 shows an example of adjusting an older movement plan to new boundary conditions.

As shown in FIG. 10, the changes in the planning boundary may require certain plans to be adjusted by removing the partial plan that includes reservations 1003, for track sections that belong to network branches that do not correspond with the current boundary (e.g., from the end of the boundary or internal boundary 1001 there is no connection to the respective following reservations in the solution chosen, as shown in FIG. 10) and replace it. The new partial plan that includes reservations 1004 is developed such that it blends well with the rest of the plan (i.e., follows an appropriate order of resource allocations), while it reserves track sections considering the current planning boundary. The reservations 1003 belong to a train plan 1002 in the old movement plan. The partial plan removed may include reservations for multiple trains, such as reservations 1003, for a single train, belonging to the former train plan 1002. Those reservations are replaced by the reservations 1004 for the new partial plan. The partial plans for each service may include reservations for multiple track sections (e.g., as separated by vertical lines 1006 in FIG. 10) and may cover multiple signal lamps, such as signal lamp 1005 (FIG. 10 shows only a few lamps in one direction; those lamps are relevant to the direction of movement planned for near the planning boundary for the train plan presented).

If the solution from 176 was null, or after 190, the selected agent from 186 is applied, (i.e., executed) at 192, using the selected solutions from 176, as needed.

Then, at 193 and 194, it is respectively determined if the cycle should be interrupted (by a re-planning request) at 193, and/or if it is the end of the planning cycle at 194. If the cycle is interrupted, at 193, then the plan generator 56 will continue at 160 (i.e., a new planning cycle under new conditions). The determination of a re-planning request, at 193, is the same as was discussed above at 178 of FIG. 5A. This permits the normal planning cycle to be "interrupted", without re-evaluating, at 134 of FIG. 4, and publishing, at 120 of FIG. 4, a new movement plan. Otherwise, in order to determine the end of the cycle, the stored time of the cycle start, at 160, may be compared, at 194, to the current time, for example. If that difference exceeds a predetermined time, then, at 196, execution resumes at step 134 of FIG. 4, in order to re-evaluate the published movement plan 4. Otherwise, execution resumes at 186, with the selection of another agent followed by the selection of another solution(s). As a non-limiting example, the cycle time of the normal planning cycle may be about 60 seconds, and the cycle time of the re-planning cycle may be about 90 seconds. For an even faster response, plans may be published before the end of the planning cycle. Also, reduced planning windows and/or smaller regions and/or parallel processing may be employed to improve the response time, where needed.

EXAMPLE 13

At steps 156,158,192, the corresponding objective function value is preferably determined for a corresponding movement plan before a produced (newly generated), adjusted, modified or re-generated solution is added or updated in the solution pool 172.

EXAMPLE 14

Preferably, at the end of the cycle, the count (e.g., 50; a suitable number) of plans in the solution pool 172 is the same as the count from the previous cycle. For example, besides destroying plans using the destroyer agents, such as A1, the pool 172 is preferably maintained below a maximum count of solutions. For example, one or more solutions having the highest objective function values are destroyed.

EXAMPLE 15

Steps 182 and 184 employ an age associated with each of the movement plans in the pool 172, downgrade the corresponding objective function values of the corresponding movement plans in the pool 172 as a function of the age, and re-order the corresponding movement plans responsive to the downgrading.

EXAMPLE 16

The objective function value of older solutions, such as 166,168,170, may be altered according to Equations 11 and 12.

$$f(n) = \theta(n - (N_0 + n_0))\left(1 + \frac{|f(N_0)|}{f(N_0)} D(n)\right) f(N_0) \quad \text{(Eq. 11)}$$

$$D(n) = \frac{(n - N_0)T_c}{T} q \quad \text{(Eq. 12)}$$

wherein:
$\theta(x)=0$, for (x<0) or (x=0);
$\theta(x)=1$, for x>0;
n is the n'th planning cycle;

$$n < N_0 + \frac{T}{T_c};$$

$N_0$ is the planning cycle that created the particular solution;
$f(N_0)$ is initial value of the objective function at creation of the corresponding solution;
$n_0$ is the number of cycles after creation before downgrading the solution;
q is a configurable multiplier;

T is the planning window, with T=planning horizon−current time; and $T_c$ is the duration of the normal planning cycle.

Equation 11 allows a solution to maintain its value for a few cycles ($n_0$), by employing the θ function in the manner disclosed. The function D(n) of Equation 12 implements progressive aging after no cycles. The condition, $$n < N_0 + \frac{T}{T_c},$$

provides for discarding of the solution after a full planning window has passed. The factor, |f(N)|/f(N), is employed to allow both positive and negative objective function values to be degraded by D(n).

In the exemplary embodiment, the older solutions are not considered for publishing even when the objective function value indicates that an older solution is the "best". Only solutions developed in the current planning cycle using any of the disclosed methods are considered to replace the currently executed plan. In a normal planning cycle, when the best solution is an older solution, it may be regenerated and if it is still the best, then it may be considered to replace the plan under execution.

Plan Monitor

The plan monitor 58 provides, at 130 and 118 of FIG. 4, the plan generator 56 with a new planning boundary 74 and 74' (FIG. 4) for each planning cycle and determines, at 150, the need for re-planning. The planning boundary, such as 74, is defined by analyzing train positions, while the evaluation of re-planning conditions also employs a review of the field changes (current and within the planning horizon) such as, for example, device blocks and speed restrictions. The planning boundary is suitably chosen (e.g., it features a temporal buffer at the end of the committed reservations 34,36,38 (FIG. 9) in the form of the reservations 46,48 (FIG. 9) expected to be committed), in order to efficiently determine new solutions that can be implemented. The size of the planning boundary's buffer depends on the planning cycle and operational requirements with respect to committed reservations. Committing a reservation may require other reservations to be committed (e.g., which is equivalent to the number of routes that need to be lined in order to provide continuous train movement on "high green").

Referring to FIG. 6, the plan monitor 58 is shown by employing unified modeling language (UML) notations, in which relatively higher level components depend on lower level components (e.g., a hierarchical design). The plan monitor 58 includes both a Gap Analysis module 200 and a PlanBoundaries module 208. The module 200 employs the difference between the last published movement plan 4 (FIG. 3) and the conditions in the field 12 (FIG. 3) and generates recommendations for re-planning. The module 200 employs a Speed Restriction module 202, a Blocks module 204 and a TrainGap module 206. The module 208 also employs the TrainGap module 206 to determine the planning boundary 74 (FIG. 3) based on train positions as captured in that module 206. The gap between the planned position of a train and the real position of such train is employed to redefine elements of the planning boundary 74.

The PlanBoundaries module 208 manages the boundary for each train service. The boundary extends further than the projected lined route, in order to allow for near future movements to take place without significant changes to the boundary (e.g., no changes to train paths). The actual speed of the trains is evaluated to facilitate the determination of the reservation times in the planning boundary. The speed may be evaluated, for example, based on the indications from the field (e.g., actual moves from track section to track section). The precision depends on the input regarding the position of trains. With advanced technologies, such as ones employing GPS, the information on position and speed of the trains becomes very accurate, and the reservation times may be calculated more accurately. Even with less accurate information, the system works well because the most important aspect of the planning boundary is the path of the trains in the near future.

Figure 7:
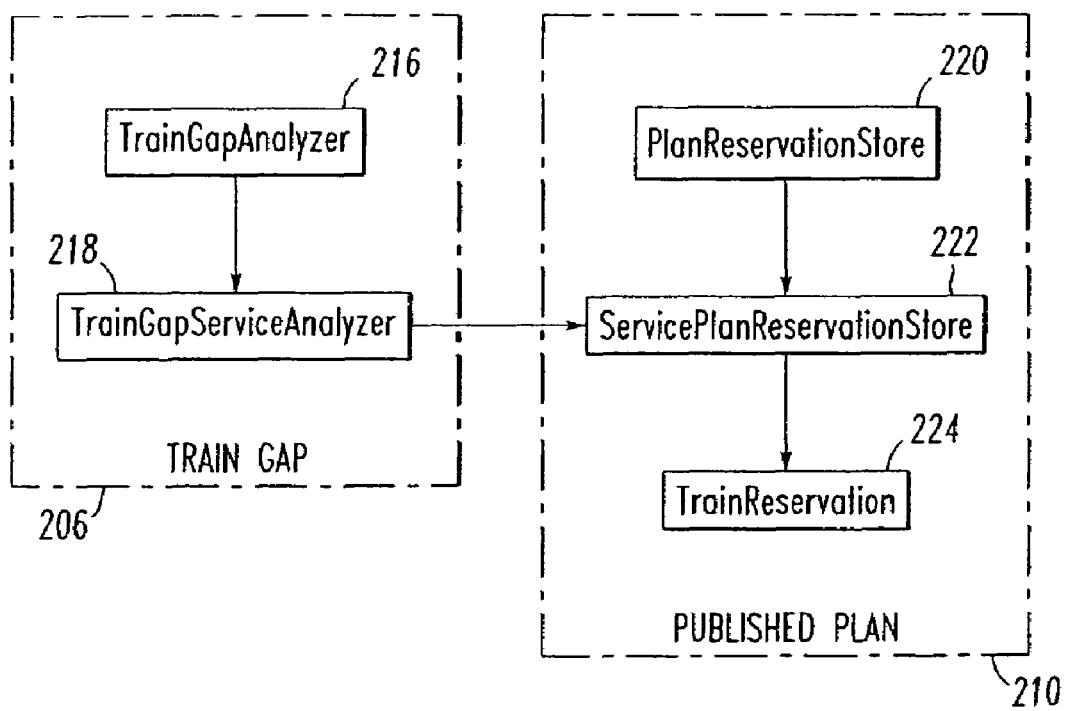
FIG. 7 is a block diagram of the TrainGap and PublishedPlan components of the plan monitor of FIG. 6.

The TrainGap module 206 and PublishedPlan module 210 are shown in FIG. 7. The gap is determined for each train service. The position of each train (not shown in FIG. 7) is evaluated at the beginning of each planning cycle and is compared to the most recently published movement plan 4 (FIG. 3). This information is used by both the GapAnalysis module 200 and the PlanBoundaries module 208 of FIG. 6.

The TrainGap module 206 includes a TrainGapAnalyzer component 216, which summarizes the information provided by a TrainGapServiceAnalyzer component 218, which determines the gap between planned and actual train positions for each train.

The PublishedPlan module 210 includes a PlanReservationStore component 220, which maintains the complete set of reservations of the published movement plan 4 for the benefit of the plan monitor 58 by aggregating information provided and maintained by a ServicePlanReservationStore component 222, which, in turn, relies on a TrainReservation component 224 to maintain the reservation itself.

In regular operations, the path defined in the planning boundary 74 (FIG. 3) does not change because the boundary information includes a sub-plan (e.g., a summary of reservations that define the planning boundary) that cannot be altered in the generation of a new movement plan. Altering the path defined by the committed reservations 34,36,38 (FIG. 9) requires manual intervention. The path defined in the reservations 46,48 (FIG. 9) expected to be committed in the near future may change as a result of some perturbations. The plan monitor 58 recognizes external changes to the planning boundary 74 as well as the need to change the buffer portion. Both of these cases are accompanied in most cases by re-planning (i.e., steps 156,158 of FIG. 5A).

Considering the path fixed, the relevant gap information includes times of entering and exiting of a certain railroad segment, such as 26,28,40 of FIG. 9. The time when a train, such as 24 of FIG. 9, leaves a track section and enters another is determined when the position of the train is evaluated. Messages regarding train positions 108 (FIG. 3) are sent when, for example, certain track sections-recognize the presence of a train (although there is some propagation delay in the CAD system 14). The time evaluated based on the train movement in the field 12 is tnen compared to the currently executing movement plan 13 (FIG. 1) and the planning boundary 74 is suitably adjusted.

Delays may impact the various reservations in the planning boundary 74. For example, the reservation (e.g., 32 of FIG. 9) of the route the train (e.g., 24 of FIG. 9) last entered (current position) is employed to project delays for the following reservations (e.g., 40,42,44 of FIG. 9) for the same train. The planned reservations are basically shifted. For the current position, the calculations employ an extension of the total duration of the reservation (e.g., delays incurred at the currently occupied track section by the first car) aside from the shift, which impacts the exit time of the first train car but not its entry time.

The impact on the subsequent reservations for delayed trains shown in Equations 13-17, below, is the most optimistic. For a realistic impact, interaction of the trains on the planning boundary 74 is considered and projected occupancies in the planning boundary are determined based on interactions with other reservations.

$$t_{LocalEntry}{}^b = t_{LocalEntry}{}^{planned} + \tau \quad \text{(Eq. 13)}$$

$$t_{EndTrainExit}{}^b = t_{EndTrainExit}{}^{planned} + \tau \quad \text{(Eq. 14)}$$

wherein:

$$t_{LocoExit}{}^{position} - t_{LocoExitPlanned} \quad \text{(Eq. 15)}$$

$$t_{LocoExit} = (t_{LocoEntry}{}^{position} - t_{LocoEntryPlanned}{}^{position}) + \tau_{extension} \quad \text{(Eq. 16)}$$

$$\tau^{extension} = (t_{EndTrainExit}{}^{position} - t_{LocoEntry}{}^{position}) - (t_{EndTrainPlanned}{}^{position} - t_{LocoEntryPlanned}{}^{postion}) \quad \text{(Eq.17)}$$

$t_{LocoEntry}{}^b$ and $t_{EndTrainExit}$ are entry/exit times for boundary reservations (all but the first);

$\tau$ is a suitably optimistic expected delay for the corresponding boundary reservation;

$t_{LocoEntry}{}^{planned}$ is the planned entry time of the first car for boundary reservations other than the ones the train is currently occupying;

$t_{EndTrainExit}{}^{planned}$ is the planned exit time of the last car for boundary reservations other than the ones the train is currently occupying;

$t_{LocoExitPlanned}{}^{position}$ in planned exit time of the first car for the reservation where the first car currently is;

$t_{LocoEntry}{}^{position}$ is the actual entry time of the first car for the reservation of the track section where the first car currently is;

$t_{LcoEntryPlanned}{}^{position}$ is the planned entry time of the first car for the reservation where the first car currently is;

$t_{EndTrainExit}{}^{position}$ is the expected exit time of the last car for the reservation where the first car currently is;

$t_{EndTrainExitPlanned}{}^{position}$ is the planned exit time of the first car for the reservation where the first car currently is; and $\tau_{extension}$ is the extension on the current reservation where the first car is.

LocoEntry/Exit is considered to be the entry/exit of the head of the train. Equations 13-17 imply that a train may be late to the current track section as well as it may gain additional delay (i.e., extension) on the current reservation. These observations are used in determining the new planning boundary 74'. The planning boundary is more accurately determined if each train's actual speed is determined in addition to late arrival and additional delay on the current track section. This information is used to recalculate the reservation intervals for the planning boundary.

The impact of trains arriving early may be determined in a similar way. Dependency on other trains may limit the impact on the internal boundary in this case (that has the largest effect on future plans). The re-evaluation of the reservations within the deep planning boundary preserves the order in the currently executing movement plan 13 (FIG. 1) and obeys the permanent and current temporary constraints (e.g., current speed restrictions). This method considers the current position of the train and its speed.

The GapAnalysis module 200 (FIG. 6) calculates the re-planning score 214 based on blocks, speed restrictions and the train position gap as shown in Equations 18 and 19.

$$\text{replanning score} = w_{block} * 10^7 * \sum_{i=1}^{n} \frac{(T - T_i) * n_i^{trains}}{T * n_{horizon}^{trains}} \left(\frac{t_i}{T} * \frac{l_i}{L}\right) + \quad \text{(Eq. 18)}$$

$$w_{speedres} * 10^7 * \sum_{i=1}^{m} \frac{(T - T_i)}{T * n_{horizon}^{trains}}$$

$$\sum_{k=1}^{r} n_k^i \left( \frac{t_i}{T * L} \sum_{j=1}^{p_i} l_j \frac{v_k^i(j) - v_i^{reduced}}{v_k^i(j)} \theta(v_k^i(j) - v_i^{reduced}) \right) +$$

$$w_{posgaps} * \sum_{i=1}^{s} \frac{|\Delta t_i| * T_s}{T_c^2}$$

$$n_i^{trains} = \sum_{k=1}^{r} n_k^i \quad \text{(Eq. 19)}$$

wherein:

$w_{block}$ is a specific weight for blocks;
$w_{speedres}$ is a specific weight for speed restrictions;
$w_{posgaps}$ is a specific weight for position gaps;
n is number of new or changed blocks (track; switch blocks);
m is number of speed restrictions changed;
s is number of services;
$l_i$ is length of trackage affected by change;
$t_i$ is duration of change (block or restriction) or time shift for reservations;
T is the planning horizon (relative to current time) or planning window;
L is the total length of the main tracks in the planning area;
$l_j$ is track length of track section;
$v_i^{reduced}$ is restricted speed for restriction i;
$p_i$ is number of track segments affected by speed restriction i;
$\Delta t_i$ is arrival deviation (seconds);
$T_s$=t(final destination)−t(expected), which is the time left for the service (minutes);
$T_c$ is planning cycle time (seconds);
$T_i$ is perturbation start time (relative to current time);
$n_{horizon}{}^{trains}$ is number of trains in the planning horizon;
$v_k^i(j)$ is the lowest preexisting speed limit applicable to train type k over the track section j covered by the temporary speed restriction i;
$n_k^i$ is the number of trains of train type k over the restricted area i;
$n_i^{trains}$ is number of trains in the planning horizon over perturbed area;
$w_{block}$, $w_{speedres}$ and $w_{posgaps}$ are between, for example, about 0.5 and about 5.0; and
r is the number of train types over the restricted areas.

The three specific weights are preferably calibrated based on expected effect on the plan and plan generation. A block that generates the same change in a plan with the position gaps of multiple trains provides a way to choose the actual value of the two corresponding specific weights. The tests may be repeated multiple times with different blocks and number of trains delayed (position gap). Still different contributions to the re-planning may be chosen depending on the difficulty to re-generate plans when applying the perturbation. The correlation between the speed restriction is captured directly in Equation 18 as discussed below. However, different weights may be chosen, based on re-generation and re-planning difficulty, in general.

Equation 18 is devised in order that when the speed restriction $v_i^{reduced}$ is close to zero, the speed restriction term (i.e., second line of Equation 18) provides the same results as the block term (i.e., first line of Equation 18) (assuming that the effective perturbation applies in exactly the same conditions in both cases) if there are not different weights. Both the addition and removal of perturbations are consistent using Equations 18 and 19.

In Equation 18, the term $(T-T_i)/T$ represents dampening of the perturbation effect on the current published movement plan due to its distance in time from the boundary. Similarly, the term $n_i^{trains}/n_{horizon}^{trains}$ represents dampening of the relative perturbation effect due to the number of trains that are planned to use the perturbed area compared to the total number of trains planned for. The re-planning score of Equation 18 may be adjusted to also account for changes in train schedules as shown in Equation 20.

$$\text{replanning score} = \text{replanning score} + w_{schedule} \left( \frac{n_{change}^{trains}}{n_{horizon}^{trains}} \sum_{i=1}^{n_{change}^{trains}} \frac{T - T_i^{change}}{T} + \frac{n_{new}^{trains}}{n_{horizon}^{trains} + n_{new}^{trains}} \sum_{i=1}^{n_{new}^{trains}} \frac{T - T_i^{start}}{T} \right) \quad \text{(Eq. 20)}$$

wherein:
$T_i^{start}$ is start time of a new train;
$T_i^{change}$ is change time in the schedule;
$n_{change}^{trains}$ is number of train schedules changed;
$n_{new}^{trains}$ is number of trains added; and
$w_{schedule}$ is a specific weight for train schedule changes.

The re-planning score contribution depends on the relative number of changed trains, $n_{change}^{trains}/n_{horizon}^{trains}$, and the relative number of new trains, $n_{new}^{trains}/(n_{horizon}^{trains}+n_{new}^{trains})$, that represent complexity factors. For a complete contribution to the re-planning score, both of these two terms are multiplied by the relative total duration of the changed or new train schedules.

When a threshold corresponding to the re-planning score 214 (FIG. 6) is exceeded (e.g., as determined at 150 of FIG. 4), the re-planning cycle takes place at 152. The plan monitor 58 submits the re-planning request 72 (FIG. 1) accompanied by the re-planning score 214 and the new planning boundary 74' (FIG. 4) to the plan generator 56. Different levels of re-planning are considered by the plan generator 56, depending on the re-planning score 214, as was discussed above in connection with steps 156,158 of FIG. 5A. Exceeding the re-planning threshold does not imply changes to the planning boundary, although many times the planning boundary is affected. Events that are expected to happen in the future may not affect the planning boundary, but may have a significant impact on the movement plan beyond the planning boundary. Hence, a new movement plan may have to be produced immediately in order to ensure good quality of the new movement plans.

Also, the plan monitor 58 may trigger re-planning when, for example, special events that are not currently covered in the example re-planning score 214, Equation 18, happen, such as, for example, train ordering change (e.g., trains coming to the planning area; train formed at stations in the planning area) and manual actions resulting in moving trains off the planned path. The above actions alter the planning boundary 74.

Also, certain train schedule changes may trigger re-planning immediately, especially when the boundary is invalidated (e.g., changes to the schedule within the planning boundary 74 or when a large number of train schedules are modified or added to the current schedule with the intention to significantly alter the current schedule). Otherwise, changes to the schedules contribute to the re-planning score as shown in Equation 20, above. Schedule changes that do not alter the planning boundary or are not in the proximity of the boundary need not trigger re-planning by themselves, but they could contribute to the re-planning decision by increasing the re-planning score. Alternatively, the re-planning score may be increased after the re-planning decision was made (by the plan generator 56) for the purpose of guiding the planning cycle decisions.

When the continuation of the execution of the current movement plan 4 is not desirable because of changes to the planning boundary 74, the plan monitor 58 may request that the plan executive 60 stall execution for selected train services (not shown). For example, a train heading towards a recently imposed track block may be stopped at a station or junction, if the traffic conditions and constraints prohibit it from reaching the next destination, in order to await a decision of the operator (such as, for example, a schedule change). Operational rules permitting, the DOTP 2 may automatically skip certain stations (as performed by the plan generator 56) when a perturbation denies access to a destination.

Plan Executive

The plan executive 60 (FIG. 3) generates automatic control commands 86 to be executed by the CAD system 14 and/or proposed near-term movement plans, such as 110, to be executed manually (e.g., from requests made by the operator based on the proposed movement plan). The control commands 86 and the proposed near-term movement plan 110 are derived from the movement plan 4, which is published by the plan generator 56. The plan executive 60 may monitor wayside conditions (e.g., internal information and monitored information 88 from the CAD system 14), in order to trigger a sequence of plan execution steps in a timely manner (e.g., based on the current state of the field 12). The plan executive 60 may employ monitored information 88 from the CAD system 14 to prevent plan execution from compromising traffic movement in the short term (e.g., train routes are not altered, their lining is merely paused). The plan executive 60 should not cause movement plans to be recomputed, aborted or modified.

The plan executive 60 implements the movement plan 4 received from the plan generator 56 with more emphasis on sequence of operations than on absolute timing. For example, the plan executive 60 will not regulate the movement of trains to prevent earliness. An early train will be allowed to proceed and retain its earliness, as long as the schedule constraints (e.g., trains associations; departure time constraints) are not violated. Second, operations involving relative times are respected. Thus, if a train needs to mark a dwell at a particular location, the plan executive 60 pauses for the duration of that dwell before lining further signals. Third, the order of train movements is not modified. Thus, an early train might have to wait for another train if the movement plan 4 (FIG. 3) so dictates.

The plan executive 60 employs four steps in the execution of movement plan 4. First, information 88, including traffic conditions and the state of the field devices, is input from the CAD system 14 (FIG. 3). This captures the railroad state change, be it a device state transition, or an office-imposed condition (e.g., a track block). Second, the possible impact of the state change on the execution of the movement plan 4 is assessed and the affected reservations are determined. Third, the possible interactions of the current reservations with overall movement plan execution are assessed along with the progress of individual traffic elements. This includes checking track conditions (e.g., availability) downstream of the current position of the train. This may result in refraining from further execution of the current movement plan 13 (FIG. 1) for selected trains, rather than changing the current movement plan. Fourth, the current movement plan 13 is executed by requesting the control commands 86 (FIG. 3) and/or preparing the near-term proposed movement plan 110 (FIG. 3) for the eligible reservations.

EXAMPLE 17

The string-line train graph 21 of FIG. 8 illustrates a movement plan that resulted from dynamically adding a track block at location "Ltest" 226. For example, trains moving around the block can be noticed on the graph because they switch lines (e.g., different drawing line types or colors (not shown) of the string-lines signify different railroad lines; solid lines represent fast lines in both directions; dotted lines represent slow lines in both directions). In this example, all trains, such as 228,230,232, that initially intend to use the fast line, but one, 234, switch tracks before Ltest 226, and return to their initial line (e.g., the line style may change from solid (fast) to dotted (slow) and then back to solid for trains 228,230,232). The one train 234 waiting in front of the block because there is no way for it to automatically go around the block (i.e., it needs to stop at the blocked location, on the blocked line) shows the duration of the block (i.e., the duration corresponding to the almost horizontal line around Ltest 226). Here, the line indicates how long it takes to move over the restricted area (e.g., which may be several miles in length, including the wait in front of the restricted area). Trains, such as 242, coming from the opposite direction may have to slow down or even switch lines to deal with the congestion created by the unavailability of a line.

In a similar manner, somewhat similar results can be obtained for temporary speed restrictions (not shown).

The potential benefits of optimized traffic planning for the railroads are significant. The disclosed method and system enable a railroad to improve its on-time train performance, improve asset utilization, increase capacity utilization, increase car revenue, increase average train velocity, and increase throughput by dynamically optimizing the movements of trains across a railroad network.

While for clarity of disclosure reference has been made herein to the displays 20,22, for displaying information, such as train graphs and track diagrams, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of generating optimized traffic movement plans for a region having a plurality of traffic and a plurality of traffic conditions, said method comprising:
   determining a first planning boundary for said traffic based upon the traffic conditions of said region;
   employing said first planning boundary and repetitively generating a first plurality of traffic movement plans for the traffic of said region;
   selecting one of said first plurality of traffic movement plans as a first optimized traffic movement plan for execution;
   outputting said first optimized traffic movement plan for controlling traffic movement in said region;
   determining current traffic conditions of said region;
   updating said first planning boundary to provide a second planning boundary for said traffic based upon said current traffic conditions;
   employing said second planning boundary and repetitively generating a second plurality of traffic movement plans for the traffic of said region;
   selecting one of said first and second plurality of traffic movement plans as a second optimized traffic movement plan for execution; and
   outputting said second optimized traffic movement plan for controlling traffic movement in said region.

2. The method of claim 1 further comprising:
   selecting said first optimized traffic movement plan as said second optimized traffic movement plan for execution.

3. The method of claim 1 further comprising:
   selecting one of said first plurality of traffic movement plans as said second optimized traffic movement plan for execution.

4. The method of claim 1 further comprising:
   selecting one of said second plurality of traffic movement plans as said second optimized traffic movement plan for execution.

5. The method of claim 1 further comprising:
   employing a first plurality of traffic conditions for said first optimized traffic movement plan; and
   comparing said current traffic conditions against the first plurality of traffic conditions for said first optimized traffic movement plan, and continuing to plan with the second planning boundary based substantially upon said first plurality of traffic movement plans to repetitively generate said second plurality of traffic movement plans for the traffic of said region.

6. The method of claim 1 further comprising:
   employing a first plurality of traffic conditions for said first optimized traffic movement plan; and
   comparing said current traffic conditions against the first plurality of traffic conditions for said first optimized traffic movement plan, and responsively re-planning with the second planning boundary to repetitively generate as said second plurality of traffic movement plans for the traffic of said region: (a) a third plurality of traffic movement plans based substantially upon some of said first plurality traffic movement plans for the traffic of said region, and (b) a fourth plurality of traffic movement plans independent of said first plurality traffic movement plans for the traffic of said region.

7. The method of claim 5 further comprising:
   associating an objective function value with each of said first and second plurality of traffic movement plans; and
   employing as said continuing to plan with the second planning boundary:

destroying at least one of said first plurality of traffic movement plans based upon said objective function values, modifying at least one of said first plurality of traffic movement plans, in order to improve the objective function value thereof, employing a plurality of said first plurality of traffic movement plans to generate one of said second plurality of traffic movement plans, modifying at least one of said first plurality of traffic movement plans responsive to at least one perturbation associated with said current traffic conditions, and generating at least one of said second plurality of traffic movement plans independent of said first plurality of traffic movement plans.

8. The method of claim 1 further comprising:
determining objective function values for said first and second plurality of traffic movement plans; and
selecting said one of said first and second plurality of traffic movement plans as said second optimized traffic movement plan based upon said objective function values.

9. The method of claim 8 further comprising:
employing a plurality of goals for each of said objective function values.

10. The method of claim 8 further comprising:
ranking said first and second plurality of traffic movement plans based upon the objective function values; and
selecting said second optimized traffic movement plan for execution based upon said ranking.

11. The method of claim 1 further comprising:
continuing said employing said first planning boundary and repetitively generating a first plurality of traffic movement plans for the traffic of said region for a predetermined time before said selecting one of said first plurality of traffic movement plans as a first optimized traffic movement plan for execution.

12. The method of claim 1 further comprising:
associating a first planning horizon with said first planning boundary and a later second planning horizon with said second planning boundary;
inputting schedule changes;
adjusting at least one of said first plurality of traffic movement plans to said second planning horizon and said schedule changes; and
generating at least one of said second plurality of traffic movement plans employing said adjusted at least one of said first plurality of traffic movement plans.

13. The method of claim 12 further comprising:
continuing said adjusting and said generating at least one of said second plurality of traffic movement plans for a predetermined time before said updating said first planning boundary.

14. The method of claim 12 further comprising:
providing a corresponding objective function value and a corresponding age for each of said first and second plurality of traffic movement plans; and
downgrading the corresponding objective function value as a function of the corresponding age for each of said first plurality of traffic movement plans.

15. The method of claim 1 further comprising:
deleting at least one of said first plurality of traffic movement plans.

16. The method of claim 6 further comprising:
determining objective function values for said first and second plurality of traffic movement plans; and selecting said one of said first and second plurality of traffic movement plans as said second optimized traffic movement plan based upon said objective function values.

17. The method of claim 6 further comprising:
associating a first planning horizon with said first planning boundary and a later second planning horizon with said second planning boundary;
inputting schedule changes;
adjusting at least one of said first plurality of traffic movement plans to said second planning horizon and said schedule changes; and
generating at least one of said second plurality of traffic movement plans employing said adjusted at least one of said first plurality of traffic movement plans.

18. The method of claim 17 further comprising:
continuing said adjusting and said generating at least one of said second plurality of traffic movement plans for a predetermined time before updating said second planning boundary.

19. The method of claim 1 further comprising:
employing a plurality of currently executing reservations with said first optimized traffic movement plan with said first planning boundary;
employing a plurality of presently committed reservations with said first optimized traffic movement plan with said first planning boundary; and
employing a plurality of reservations that are expected to be committed during a subsequent planning cycle for said second plurality of traffic movement plans with said first planning boundary.

20. The method of claim 1 further comprising:
including at least some of said first plurality of traffic movement plans and said second plurality of traffic movement plans in a pool of traffic movement plans.

21. The method of claim 20 further comprising:
employing a plurality of generations of traffic movement plans in said pool including a first generation of said first plurality of traffic movement plans and a second generation of said second plurality of traffic movement plans.

22. The method of claim 20 further comprising:
employing about 50 of said first and second plurality of traffic movement plans in said pool.

23. The method of claim 21 further comprising:
redetermining current traffic conditions of said region;
updating said second planning boundary to provide a third planning boundary for said traffic based upon said redetermined current traffic conditions;
employing said third planning boundary and repetitively generating a third plurality of traffic movement plans in a third generation of said traffic movement plans;
providing a corresponding objective function value and a corresponding age for each of the traffic movement plans of said first, second and third generations;
downgrading the corresponding objective function value as a function of the corresponding age for each of said first and second plurality of traffic movement plans;
determining a best plan based upon the downgraded corresponding objective function value for each of said first and second plurality of traffic movement plans and the corresponding objective function value for each of the traffic movement plans of said third generation; and
comparing the corresponding objective function value of said second optimized movement plan to the objective function value of said best plan, in order to determine whether to replace said second optimized traffic movement plan with said best plan.

24. The method of claim 23 further comprising:
employing a planning cycle for each of said generations; and
maintaining said objective function values for a predetermined count of said planning cycles before employing said downgrading.

25. The method of claim 24 further comprising:
employing a planning window associated with said first and second plurality of traffic movement plans; and
discarding said movement plans after said planning window has passed.

26. The method of claim 24 further comprising:
employing one of said objective function values having a positive value and another one of said objective function values having a negative value; and
downgrading both of said positive and negative values.

27. The method of claim 24 further comprising:
employing one of said objective function values having a positive value or another one of said objective function values having a negative value; and
downgrading one of said positive and negative values.

28. The method of claim 20 further comprising:
employing a corresponding objective function value for each of the traffic movement plans in said pool;
ordering the traffic movement plans in said pool based upon the corresponding objective function values; and
selecting one of said traffic movement plans in said pool as said second optimized traffic movement plan for execution based upon said ordering.

29. The method of claim 28 further comprising:
determining the corresponding objective function value for a corresponding one of said traffic movement plans before adding said corresponding one of said traffic movement plans to said pool.

30. The method of claim 29 further comprising:
ordering said corresponding one of said traffic movement plans when adding said corresponding one of said traffic movement plans to said pool.

31. The method of claim 28 further comprising:
employing a corresponding age for each of the traffic movement plans in said pool;
downgrading the corresponding objective function value of the corresponding one of said traffic movement plans in said pool as a function of the corresponding age; and
re-ordering said corresponding one of said traffic movement plans in said pool responsive to said downgrading.

32. The method of claim 20 further comprising:
deleting some of said first plurality of traffic movement plans and some of said second plurality of traffic movement plans from said pool, in order to maintain a predetermined count of traffic movement plans in said pool.

33. The method of claim 6 further comprising:
employing a plurality of types of said traffic conditions of said region; and
employing checking for changes in at least one of said types of said traffic conditions as said comparing said current traffic conditions against the first plurality of traffic conditions for said first optimized traffic movement plan.

34. The method of claim 33 further comprising:
employing at least one of changes in a railroad network and train ordering changes as said changes in at least one of said types of said traffic conditions.

35. The method of claim 6 further comprising:
comparing said current traffic conditions against said first plurality of traffic conditions for said first optimized traffic movement plan and determining a re-planning score; and
employing said re-planning when said re-planning score exceeds a predetermined value.

36. The method of claim 35 further comprising:
accounting for train schedule changes and responsively determining said re-planning score including said train schedule changes; and
employing said re-planning when said re-planning score including said train schedule changes exceeds a predetermined value.

37. The method of claim 36 further comprising:
determining a relative number of changed trains from a count of train schedules changed divided by a count of trains in a planning horizon;
determining a relative number of new trains from a count of trains added divided by a sum of said count of trains in a planning horizon and said count of trains added; and
employing said relative number of changed trains and said relative number of new trains to determine said re-planning score.

38. The method of claim 37 further comprising:
determining a relative total duration of changed train schedules;
multiplying said relative number of changed trains by said relative total duration of changed train schedules;
determining a relative total duration of new train schedules;
multiplying said relative number of new trains by said relative total duration of new train schedules, in order to provide a product; and
employing said product to determine said re-planning score.

39. The method of claim 6 further comprising:
comparing said current traffic conditions against said first plurality of traffic conditions for said first optimized traffic movement plan and determining a re-planning score;
employing a plurality of types of said traffic conditions of said region; and
employing said re-planning when said re-planning score exceeds a predetermined value or in response to changes in at least one of said types of said traffic conditions.

40. The method of claim 39 further comprising:
determining a count as a function of said re-planning score; and
generating said count of said fourth plurality of traffic movement plans.

41. The method of claim 40 further comprising:
employing as said count a first count;
determining a second count of said first plurality of traffic movement plans;
determining a percentage from said function of said re-planning score; and
determining said first count as said percentage times said second count.

42. The method of claim 39 further comprising:
determining a count as a function of said re-planning score; and
re-generating said count of said third plurality of traffic movement plans.

43. The method of claim 42 further comprising:
employing as said count a first count;
determining a second count of said first plurality of traffic movement plans;
determining a percentage from said function of said re-planning score; and
determining said first count as said percentage times said second count.

44. The method of claim 39 further comprising:
determining a first count and a second count as functions of said re-planning score;
re-generating said first count of said third plurality of traffic movement plans; and
generating said second count of said fourth plurality of traffic movement plans.

45. The method of claim 39 further comprising:
employing a first function of said re-planning score for said first count;
employing a second function of said re-planning score for said second count; and
employing a sum of said first and second functions being equal to one.

46. The method of claim 39 further comprising:
employing a first function of said re-planning score for said first count;
employing a second function of said re-planning score for said second count; and
employing a sum of said first and second functions being less than 0.5 when no schedule changes are present.

47. The method of claim 1 further comprising:
providing a first objective function value for said first optimized traffic movement plan based upon said current traffic conditions;
determining a best plan from one of said first and second plurality of traffic movement plans;
providing a second objective function value for said best plan based upon said current traffic conditions; and
comparing said first objective function value to said second objective function value, in order to determine whether to replace said first optimized traffic movement plan with said best plan.

48. The method of claim 47 further comprising:
determining that said second objective function value is less than said first objective function value by a predetermined amount and responsively replacing said first optimized traffic movement plan with said best plan.

49. The method of claim 47 further comprising:
providing a corresponding objective function value and a corresponding age for each of said first and second plurality of traffic movement plans;
downgrading the corresponding objective function value as a function of the corresponding age for each of said first plurality of traffic movement plans;
determining said best plan based upon the downgraded corresponding objective function value for each of said first plurality of traffic movement plans and the corresponding objective function value for each of said second plurality of traffic movement plans; and
comparing said first objective function value to the objective function value of said best plan, in order to determine whether to replace said first optimized traffic movement plan with said best plan.

50. The method of claim 6 further comprising:
comparing said current traffic conditions against the first plurality of traffic conditions for said first optimized traffic movement plan and determining a re-planning score;
determining that said re-planning score has exceeded a predetermined value and responsively employing said current traffic conditions to generate said second plurality of traffic movement plans;
providing a first objective function value for said first optimized traffic movement plan based upon said current traffic conditions;
determining a best plan from one of said first and second plurality of traffic movement plans;
providing a second objective function value for said best plan based upon said current traffic conditions; and
comparing said first objective function value to said second objective function value, in order to determine whether to replace said first optimized traffic movement plan with said best plan.

51. The method of claim 6 further comprising:
employing a plurality of types of said traffic conditions of said region;
determining changes in at least one of said types of said traffic conditions of said region in said current traffic conditions and responsively employing said current traffic conditions to generate said second plurality of traffic movement plans;
providing a first objective function value for said first optimized traffic movement plan based upon said current traffic conditions;
determining a best plan from one of said first and second plurality of traffic movement plans;
providing a second objective function value for said best plan based upon said current traffic conditions; and
comparing said first objective function value to said second objective function value, in order to determine whether to replace said first optimized traffic movement plan with said best plan.

52. The method of claim 1 further comprising:
generating said first plurality of traffic movement plans for a plurality of trains in a railroad network in said region; and
dynamically optimizing movements of said trains across said railroad network under changes of the traffic conditions in said railroad network.

53. The method of claim 52 further comprising:
employing a plurality of track sections in said railroad network;
employing a plurality of reservations, with each of said reservations representing a planned usage of one of said track sections by one of said trains from an entry date/time to an exit date/time; and
combining said reservations to generate one of said first and second plurality of traffic movement plans.

54. The method of claim 53 further comprising:
employing said first planning boundary as a collection of said reservations;
determining a current position and a speed for each of said trains in said railroad network; and
determining said reservations from said first optimized traffic movement plan and from the current positions and speeds of said trains in said railroad network.

55. The method of claim 54 further comprising:
employing as some of said reservations a plurality of current reservations;
employing with one of said trains a first car and a last car;

employing said first car on one of said track sections;
determining a delay incurred before arriving at said one of said track sections by said first car and a delay extension incurred at said one of said track sections by said first car; and
employing said delay incurred and said delay extension incurred for each of said current reservations.

56. The method of claim 54 further comprising:
employing with said one of said trains a plurality of cars including a first car and a last car;
employing as said entry date/time a date/time of entry of the first car onto one of said track sections; and
employing as said exit date/time a date/time of exit of the last car from the last said one of said track sections.

57. The method of claim 54 further comprising:
determining a plurality of track blocks, track speed restrictions and train position gaps in said railroad network;
calculating a re-planning score based on said track blocks, said track speed restrictions and said train position gaps in said railroad network;
determining that said re-planning score has exceeded a predetermined value and responsively employing said current traffic conditions of railroad network to generate said second plurality of traffic movement plans;
providing a first objective function value for said first optimized traffic movement plan based upon said current traffic conditions of said railroad network;
determining a best plan from one of said first and second plurality of traffic movement plans;
providing a second objective function value for said best plan based upon said current traffic conditions of said railroad network; and
comparing said first objective function value to said second objective function value, in order to determine whether to replace said first optimized traffic movement plan with said best plan.

58. The method of claim 54 further comprising:
employing a plurality of train schedules for said trains;
determining at least one train schedule change for said train schedules;
responsive to said at least one train schedule change, employing said current traffic conditions of said railroad network to generate said second plurality of traffic movement plans;
providing a first objective function value for said first optimized traffic movement plan based upon said current traffic conditions of said railroad network;
determining a best plan from one of said first and second plurality of traffic movement plans;
providing a second objective function value for said best plan based upon said current traffic conditions of said railroad network; and
comparing said first objective function value to said second objective function value, in order to determine whether to replace said first optimized traffic movement plan with said best plan.

59. The method of claim 52 further comprising:
converting said first optimized traffic movement plan into a plurality of commands;
employing as said commands a plurality of route clears and control commands for said railroad network; and
outputting said route clears and said control commands for controlling real time traffic movement of said trains in said railroad network.

60. The method of claim 59 further comprising:
employing a computer-aided dispatching system to execute said route clears and said control commands.

61. The method of claim 60 further comprising:
receiving data from said computer-aided dispatching system regarding said trains in said railroad network; and
employing said data to generate said first plurality of traffic movement plans for said trains in said railroad network.

62. The method of claim 52 further comprising:
periodically generating said second plurality of traffic movement plans for the trains of said railroad network;
providing a first objective function value for said first optimized traffic movement plan based upon said current traffic conditions of said railroad network;
determining a best plan from one of said first and second plurality of traffic movement plans;
providing a second objective function value for said best plan based upon said current traffic conditions of said railroad network; and
comparing said first objective function value to said second objective function value, in order to determine whether to replace said first optimized traffic movement plan with said best plan.

63. The method of claim 62 further comprising:
employing at least one objective selected from the group comprising on-time performance, best time and minimizing overall delay to determine said first and second objective function values.

64. The method of claim 50 further comprising:
employing a plurality of types of said traffic conditions; and
employing a weighting factor for each of said types in said re-planning score.

65. The method of claim 64 further comprising:
employing as said types a first type for a plurality of track blocks, a second type for a plurality of track speed restrictions, and a third type for a plurality of train position gaps; and
employing a plurality of sums associated with said first, second and third types.

66. The method of claim 65 further comprising:
employing a zero speed associated with said track speed restrictions; and
equating the sum associated with said first type with the sum associated with said second type.

67. The method of claim 1 further comprising:
displaying a representation of said first optimized traffic movement plan.

68. The method of claim 67 further comprising:
displaying a train graph including a time-distance representation of said first optimized traffic movement plan, in order to display a plurality of planned movements of trains in a railroad network.

69. The method of claim 50 further comprising:
employing a railroad network in said region;
including a plurality of track blocks, track speed restrictions and train position gaps in said railroad network; and
determining said re-planning score as a function of said track blocks, track speed restrictions and train position gaps in said railroad network.

70. The method of claim 51 further comprising:
determining changes in train schedules and responsively generating said second plurality of traffic movement plans.

71. A dynamic optimizing traffic planning apparatus for a region having a plurality of traffic and a plurality of traffic conditions of said traffic, said apparatus comprising:

means for inputting information representing said traffic conditions; and means for executing a plurality of routines, said routines comprising:

a plan monitor determining a first planning boundary for said traffic based upon the traffic conditions of said region, determining current traffic conditions of said region, and updating said first planning boundary to provide a second planning boundary for said traffic based upon said current traffic conditions, a plan generator successively employing said first planning boundary and said second planning boundary and repetitively generating a first plurality of traffic movement plans and a second plurality of traffic movement plans, respectively, for the traffic of said region, selecting one of said first plurality of traffic movement plans as a first optimized traffic movement plan for execution, selecting one of said first and second plurality of traffic movement plans as a second optimized traffic movement plan for execution; and successively outputting said first and second optimized traffic movement plans, and a plan executive successively converting said first and said second optimized traffic movement plans into a plurality of commands for controlling traffic movement in said region.

72. The dynamic optimizing traffic planning apparatus of claim 71 wherein said plan generator employs a first plurality of traffic conditions for said first optimized traffic movement plan; wherein said plan monitor compares said current traffic conditions against the first plurality of traffic conditions for said first optimized traffic movement plan; and wherein said plan generator continues to plan with the second planning boundary for a predetermined time based substantially upon said first plurality of traffic movement plans to repetitively generate said second plurality of traffic movement plans for the traffic of said region.

73. The dynamic optimizing traffic planning apparatus of claim 71 wherein said plan generator employs a first plurality of traffic conditions for said first optimized traffic movement plan; wherein said plan monitor compares said current traffic conditions against the first plurality of traffic conditions for said first optimized traffic movement plan and responsively sends a signal to said plan generator; and wherein said plan generator, responsive to said signal, re-plans with the second planning boundary to repetitively generate as said second plurality of traffic movement plans for the traffic of said region: (a) a third plurality of traffic movement plans based substantially upon some of said first plurality traffic movement plans for the traffic of said region, and (b) a fourth plurality of traffic movement plans independent of said first plurality traffic movement plans for the traffic of said region.

74. The dynamic optimizing traffic planning apparatus of claim 71 wherein said plan executive successively converts said first and said second optimized traffic movement plans into corresponding proposed near-term movement plans for manually controlling traffic movement in said region.

75. The dynamic optimizing traffic planning apparatus of claim 71 wherein said plan executive successively converts said first and said second optimized traffic movement plans into a plurality of automatic control commands for automatically controlling traffic movement in said region.

76. The dynamic optimizing traffic planning apparatus of claim 71 wherein said region includes a commuter rail system; and wherein said traffic conditions are commuter rail traffic conditions.

77. The dynamic optimizing traffic planning apparatus of claim 71 wherein said region includes a railroad network; and wherein said traffic conditions are railroad traffic conditions.

78. The dynamic optimizing traffic planning apparatus of claim 77 wherein said plan monitor determines said first planning boundary and a corresponding planning horizon; and wherein said plan generator inputs a plurality of train schedules, train properties and track descriptions for said railroad network, and outputs as said first optimized traffic movement plan a plurality of meet/pass plans for a plurality of trains over a predetermined time interval, which extends from said first planning boundary to said corresponding planning horizon.

79. The dynamic optimizing traffic planning apparatus of claim 77 wherein said railroad network includes a plurality of trains; wherein said traffic conditions include train delays, changes in said railroad network and schedule changes for said trains; and wherein said plan monitor determines if re-planning by said plan generator is necessary from at least one of said train delays, said changes in said railroad network and said schedule changes for said trains.

80. The dynamic optimizing traffic planning apparatus of claim 71 wherein said first optimized traffic movement plan includes a plurality of first traffic conditions; wherein said means for inputting updates said information representing said traffic conditions with said current traffic conditions; wherein said plan monitor compares said current traffic conditions against the plurality of first traffic conditions of said first optimized traffic movement plan and determines a re-planning score, and determines that said re-planning score has exceeded a predetermined value; and wherein said plan generator responsively determines a first count and a second count as a function of said re-planning score, re-generates said first count of said first plurality of traffic movement plans, and generates said second count of said second plurality of traffic movement plans.

81. The dynamic optimizing traffic planning apparatus of claim 71 wherein said means for inputting updates said information representing said traffic conditions with said current traffic conditions; and wherein said plan generator provides a first objective function value for said first optimized traffic movement plan based upon said current traffic conditions, generates said second plurality of traffic movement plans for the traffic of said region, determines a best plan from one of said first and second plurality of traffic movement plans, provides a second objective function value for said best plan based upon said current traffic conditions, and compares said first objective function value to said second objective function value, in order to determine whether to replace said first optimized traffic movement plan with said best plan.

82. The dynamic optimizing traffic planning apparatus of claim 71 wherein said first optimized traffic movement plan includes a plurality of first traffic conditions; wherein said means for inputting updates said information representing said traffic conditions with said current traffic conditions; wherein said plan monitor compares said current traffic conditions against the plurality of first traffic conditions of said first optimized traffic movement plan and determines a re-planning score, and determines that said re-planning score has exceeded a predetermined value; and wherein said plan generator responsively employs said current traffic conditions to generate said second plurality of traffic movement plans, provides a first objective function value for said first optimized traffic movement plan based upon said current traffic conditions, determines a best plan from one of said first and second plurality of traffic movement plans, provides a second objective function value for said best plan based upon said current traffic conditions, and compares said first objective function value to said second objective function value, in order to determine whether to replace said first optimized traffic movement plan with said best plan.

83. The dynamic optimizing traffic planning apparatus of claim 71 wherein said means for inputting updates said information representing said traffic conditions with said current traffic conditions; wherein said plan monitor employs a plurality of types of said traffic conditions of said region, and determines changes in at least one of said types of said traffic conditions of said region in said current traffic conditions; and wherein said plan generator responsively employs said current traffic conditions to generate said second plurality of traffic movement plans, provides a first objective function value for said first optimized traffic movement plan based upon said current traffic conditions, determines a best plan from one of said first and second plurality of traffic movement plans, provides a second objective function value for said best plan based upon said current traffic conditions, and compares said first objective function value to said second objective function value, in order to determine whether to replace said first optimized traffic movement plan with said best plan.

84. The dynamic optimizing traffic planning apparatus of claim 71 wherein said means for executing includes a single processor for said plan monitor, said plan generator and said plan executive.

85. The dynamic optimizing traffic planning apparatus of claim 71 wherein said means for executing includes a first processor for said plan monitor and said plan generator, and a second processor for said plan executive.

86. The dynamic optimizing traffic planning apparatus of claim 71 wherein said means for executing includes a first processor for said plan monitor, a second processor for said plan generator, and a third processor for said plan executive.

87. A traffic management system for a region having a plurality of traffic and a plurality of traffic conditions of said traffic, said system comprising:
means for inputting information representing said traffic conditions;
means for executing a plurality of routines, said routines comprising:
a plan monitor determining a first planning boundary for said traffic based upon the traffic conditions of said region, determining current traffic conditions of said region, and updating said first planning boundary to provide a second planning boundary for said traffic based upon said current traffic conditions,
a plan generator successively employing said first planning boundary and said second planning boundary and repetitively generating a first plurality of traffic movement plans and a second plurality of traffic movement plans, respectively, for the traffic of said region, selecting one of said first plurality of traffic movement plans as a first optimized traffic movement plan for execution, selecting one of said first and second plurality of traffic movement plans as a second optimized traffic movement plan for execution; and successively outputting said first and second optimized traffic movement plans, and
a plan executive successively converting said first and said second optimized traffic movement plans into a plurality of commands for controlling traffic movement in said region; and
means for executing said commands to control traffic movement in said region.

88. The traffic management system of claim 87 wherein said means for executing said commands is a computer-aided dispatching system for controlling movements of trains in said region.

89. The traffic management system of claim 88 wherein said computer-aided dispatching system includes a database having information about railroad infrastructure and control for said region.

90. The traffic management system of claim 87 wherein said means for executing said commands is a traffic control system that issues commands for controlling said traffic.

91. The traffic management system of claim 90 wherein said traffic control system is selected from the group comprising an operations control center, a network management center, a network control center and a traffic control center.

92. The traffic management system of claim 87 wherein said region includes a railroad network having a plurality of trains; wherein said information representing said traffic conditions includes dynamic data from said railroad network; wherein said plan generator inputs a plurality of train schedules, train properties and track descriptions for said railroad network and generates as said first and second plurality of traffic movement plans a plurality of optimized meet/pass plans for said trains in said railroad network; wherein said means for executing said commands employs said dynamic data from said railroad network; and wherein said meet/pass plans do not violate any constraints on said train schedules, said train properties and said track descriptions for said railroad network based upon said dynamic data from said railroad network.

93. The traffic management system of claim 87 wherein said region includes a railroad network having a plurality of trains; and wherein said means for executing displays a train graph including a time-distance representation of said first optimized traffic movement plan, in order to display a plurality of planned movements of said trains in said railroad network.

94. The traffic management system of claim 87 wherein said first planning boundary comprises a plurality of reservations for said first optimized traffic movement plan, a plurality of presently committed reservations for said first optimized traffic movement plan, and a plurality of reservations that are expected to be committed during a subsequent planning cycle for said second plurality of traffic movement plans.

* * * * *

UNITED STATES PATENT AND TRADEMARK OFFICE
CERTIFICATE OF CORRECTION

PATENT NO. : 7,386,391 B2
APPLICATION NO. : 10/538246
DATED : June 10, 2008
INVENTOR(S) : Viorel Morariu et al.

It is certified that error appears in the above-identified patent and that said Letters Patent is hereby corrected as shown below:

Column 12, line 24, "$SP_j$" should read --$SP_i$--.

Column 12, line 60, "$f_b$" should read --$f_i$,--.

Column 19, line 59, "perhaps,by" should read --perhaps, by--.

Column 20, line 65, "two 5 associated functions" should read --two associated functions--.

Column 25, line 7, "no" should read --$n_0$--.

Column 26, line 24, "plarmed" should read --planned--.

Column 27, line 10, (Eq. 13),

"$t_{LocalEntry}^{b} = t_{LocalEntry}^{planned} + \tau$" should read -- $t_{LocoEntry}^{b} = t_{LocoEntry}^{planned} + \tau$ --.

Column 27, line 12, (Eq. 14),

"$t_{EndTrainExit}^{b} = t_{EndTrainExit}^{planned} + \tau$" should read -- $t_{EndTrainExit}^{b} = t_{EndTrainExit}^{planned} + \tau$ --.

Column 27, line 15, (Eq. 15),

"$t_{LocoExit}^{position} - t_{LocoExitPlanned}^{position}$" should read -- $\tau = t_{LocoExit}^{position} - t_{LocoExitPlanned}^{position}$ --.

Column 27, line 18, (Eq. 16),

"$t_{LocoExit}^{position} = (t_{LocoEntry}^{position} - t_{LocoEntryPlanned}^{position}) + \tau_{extension}$" should read -- $t_{LocoExit}^{position} = (t_{LocoEntry}^{position} - t_{LocoEntryPlanned}^{position}) + \tau_{extension}$ --.

Column 27, line 22, (Eq. 17),

"$\tau^{extension} = (t_{EndTrainExit}^{position} - t_{LocoEntry}^{position}) - (t_{EndTrainPlanned}^{position} - t_{LocoEntryPlanned}^{position})$" should read -- $\tau_{extension} = (t_{EndTrainExit}^{position} - t_{LocoEntry}^{position}) - (t_{EndTrainExitPlanned}^{position} - t_{LocoEntryPlanned}^{position})$ --.

Signed and Sealed this
Twenty-second Day of May, 2012

David J. Kappos
*Director of the United States Patent and Trademark Office*

CERTIFICATE OF CORRECTION (continued)
U.S. Pat. No. 7,386,391 B2

Column 27, line 24, "$t_{LocoEntry}^{b}$ and $t_{EndTrainExit}$" should read -- $t_{LocoEntry}^{b}$ and $t_{EndTrainExit}^{b}$ --.

Column 27, line 28, "$t_{LocoEntry}^{planned}$" should read -- $t_{LocoEntry}^{planned}$ --.

Column 27, line 31, "$t_{EndTrainExit}^{planned}$" should read -- $t_{EndTrainExit}^{planned}$ --.

Column 27, line 34, "$t_{LocoExitPlanned}^{position}$" should read -- $t_{LocoExitPlanned}^{position}$ --.

Column 27, line 36, "$t_{LocoEntry}^{position}$" should be -- $t_{LocoEntry}^{position}$ --.

Column 27, line 40, "$t_{LcoEntryPlanned}^{position}$" should read -- $t_{LocoEntryPlanned}^{position}$ --.

Column 27, line 42, "$t_{EndTrainExit}^{position}$" should read -- $t_{EndTrainExit}^{position}$ --.

Column 27, line 44, "$t_{EndTrainExitPlanned}^{position}$" should read -- $t_{EndTrainExitPlanned}^{position}$ --.

Column 28, line 10, (Eq. 18), "$w_{speedres}$" should read -- $+w_{speedres}$ --.

Column 28, line 15, (Eq. 18), "$w_{posgaps}$" should read -- $+w_{posgaps}$ --.

Column 28, line 34, "section;" should read --section j;--.

Column 28, line 44, "$n_{horizon}^{trains}$" should read -- $n_{horizon}^{trains}$ --.

Column 28, line 52, "wspeedres" should read -- $W_{speedres}$ --.

Column 29, line 12, "$n_i^{trains}/n_{horizon}^{trains}$" should read -- $n_i^{trains}/n_{horizon}^{trains}$ --.

Column 29, line 20, (Eq. 20),

*replanning score =*

"*replanning score* $+w_{schedule}\left(\dfrac{n_{change}^{trains}}{n_{horizon}^{trains}}\sum_{i=1}^{n_{change}^{trains}}\dfrac{T-T_i^{change}}{T}+\dfrac{n_{new}^{trains}}{n_{horizon}^{trains}+n_{new}^{trains}}\sum_{i=1}^{n_{new}^{trains}}\dfrac{T-T_i^{start}}{T}\right)$,"

should read

*replanning score = replanning score +*

-- $+w_{schedule}\left(\dfrac{n_{change}^{trains}}{n_{horizon}^{trains}}\sum_{i=1}^{n_{change}^{trains}}\dfrac{T-T_i^{change}}{T}+\dfrac{n_{new}^{trains}}{n_{horizon}^{trains}+n_{new}^{trains}}\sum_{i=1}^{n_{new}^{trains}}\dfrac{T-T_i^{start}}{T}\right)$ --.

Column 29, line 33, "$n_{change}^{trains}$" should read -- $n_{change}^{trains}$ --.

Column 29, line 34, "$n_{new}^{trains}$" should read -- $n_{new}^{trains}$ --.

CERTIFICATE OF CORRECTION (continued)

U.S. Pat. No. 7,386,391 B2

Column 29, line 37, "$n_{change}^{trains} / n_{horizon}^{trains}$" should read -- $n_{change}^{trains} / n_{horizon}^{trains}$ --.

Column 29, lines 38 and 39, "$n_{new}^{trains} / (n_{horizon}^{trains} + n_{new}^{trains})$" should read -- $n_{new}^{trains} / (n_{horizon}^{trains} + n_{new}^{trains})$ --.